United States Patent
Root et al.

(10) Patent No.: US 11,542,969 B2
(45) Date of Patent: Jan. 3, 2023

(54) POLE CLAMP

(71) Applicant: Ubicquia LLC, Melbourne, FL (US)

(72) Inventors: Jeffrey T. Root, Melbourne, FL (US); Ian B. Aaron, Melbourne, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 6 days.

(21) Appl. No.: 16/797,344

(22) Filed: Feb. 21, 2020

(65) Prior Publication Data
US 2020/0300279 A1 Sep. 24, 2020

Related U.S. Application Data

(60) Provisional application No. 62/851,035, filed on May 21, 2019, provisional application No. 62/809,520, filed on Feb. 22, 2019.

(51) Int. Cl.
| | | |
|---|---|---|
| *F16L 3/01* | (2006.01) | |
| *F16B 2/06* | (2006.01) | |
| *F16L 23/00* | (2006.01) | |
| *F21S 8/08* | (2006.01) | |
| *F16L 23/02* | (2006.01) | |

(Continued)

(52) U.S. Cl.
CPC .............. *F16B 2/065* (2013.01); *F21S 8/086* (2013.01); *F16L 3/01* (2013.01); *F16L 3/10* (2013.01); *F16L 23/02* (2013.01); *F16L 23/036* (2013.01)

(58) Field of Classification Search
CPC ... F16B 2/065; F21S 8/086; F21S 8/04; F21S 8/08; E02D 7/086; F16L 3/222; F16L 3/10; F16L 3/01; F16L 23/00; F16L 23/02; F16L 23/036
See application file for complete search history.

(56) References Cited

U.S. PATENT DOCUMENTS 3,843,083 A * 10/1974 Angibaud ................. A45F 5/00
403/90
7,168,212 B2 * 1/2007 Jette .................. E04F 15/02458
211/181.1
(Continued)

FOREIGN PATENT DOCUMENTS

CN 209280925 U * 8/2019

OTHER PUBLICATIONS

Bohmbach, Nate, link at https://www.ishn.com/articles/108556-coming-this-year-a-new-standard-to-prevent-dropped-objects, "Coming This Year, A New Standard To Prevent Dropped Objects," May 14, 2018, 3 pages.

(Continued)

*Primary Examiner* — Tan Le
(74) *Attorney, Agent, or Firm* — Daniel C. Crilly; Thomas J. Satagaj

(57) ABSTRACT

A clamp includes a first clamp body portion arranged for removable coupling about a generally cylindrical support structure to a second clamp body portion. The first clamp body portion includes a first clamp structure containing a first generally semi-spherical floating bushing, the first generally semi-spherical floating bushing coupled to the first clamp structure. The second clamp body portion includes a second clamp structure containing a second generally semi-spherical floating bushing, the second generally semi-spherical floating bushing coupled to the second clamp structure.

19 Claims, 18 Drawing Sheets

(51) Int. Cl.
  *F16L 3/10*      (2006.01)
  *F16L 23/036*    (2006.01)

(56)         References Cited

U.S. PATENT DOCUMENTS

| | | | | |
|---|---|---|---|---|
| 7,309,054 | B2* | 12/2007 | Slatter | F16B 2/065 |
| | | | | 248/521 |
| 9,682,759 | B1* | 6/2017 | Huntley | B63H 20/10 |
| 10,800,540 | B2* | 10/2020 | Gilbertson | B64D 37/005 |
| 11,047,104 | B2* | 6/2021 | Downey | E02D 27/12 |
| 2004/0061030 | A1* | 4/2004 | Goodwin | H02G 7/053 |
| | | | | 248/68.1 |
| 2005/0247829 | A1* | 11/2005 | Low | H02G 3/32 |
| | | | | 248/68.1 |
| 2016/0010894 | A1* | 1/2016 | Kuckelkorn | F24S 80/60 |
| | | | | 126/652 |
| 2017/0356570 | A1* | 12/2017 | Downey | F16B 2/065 |

OTHER PUBLICATIONS

Bohmbach, Nate, link at https://www.ishn.com/articles/96697-falling-objects-can-be-a-fatal-threat, "Falling Objects Can Be a Fatal Threat," Sep. 5, 2013, 3 pages.

Medsafe link at https://blog.gosafe.com/dropped-object-prevention-in-powered-aerial-lifts, "Dropped Object Prevention In Powered Aerial Lifts," Feb. 20, 2018, 4 pages.

\* cited by examiner

POLE CLAMP

CROSS-REFERENCE TO RELATED APPLICATIONS

This application claims the priority benefit of U.S. Provisional Patent Application No. 62/809,520, filed Feb. 22, 2019, and U.S. Provisional Patent Application No. 62/851,035, filed May 21, 2019. Each of these applications is hereby incorporated by reference in its entirety.

BACKGROUND

Technical Field

The disclosure is generally directed to a multi-part clamp. More specifically, but not exclusively, the disclosure relates to systems, devices, and methods to clamp an object to a generally cylindrical support structure.

Description of the Related Art

Binding structures, such as those found in nature (e.g., fingers, jaws, certain animal tails, certain insect and reptile claws, and the like), have been replicated since at least the earliest industrial ages. Screws, nails, adhesives, hook-and-loop mechanisms, clamps, vises, grips, presses, braces, clasps, brackets, fasteners, and many other binding means are known. Such devices are used to fasten, secure, fix, clinch, clench, squeeze, press, grip, hold, brace, or otherwise immobilize at least one object relative to at least one other object.

In recent centuries, certain clamps have been devised to bind one object to a pole, pipe, cable, or other generally cylindrical structure. One family of these prior art clamps are conventionally referred to as U-bolts, horseshoe bolts, or the like. U-bolt style clamps are known to be effective in certain circumstances. In at least some cases, U-bolt style clamps have a very low and binding force. Another family of clamps, which are conventionally referred to as band clamps, pipe clamps, or the like, typically have more binding force than U-bolts. While band clamps may be separated and placed around a pole structure, they are typically threaded over one unrestricted end of the pole to which they will be bound.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The use of known pole clamps to removably affix a device to a generally cylindrical structure has led to the discovery of a significant drawback with the conventional approach. Conventional pole clamps fail to provide sufficient force on the generally cylindrical structure to hold a device without loosening, slipping, rotating, deforming (e.g., crushing) the generally cylindrical structure, and the like. The device, method, and system embodiments described in this disclosure (i.e., the teachings of this disclosure) improve clamps arranged to removably or fixedly bind an object such as an aerial fixture to a generally cylindrical support structure such as the arm of a light pole.

In a first embodiment, a clamp includes a first clamp body portion that is arranged for removable coupling about a generally cylindrical support structure to a second clamp body portion. The first clamp body portion includes a first clamp structure containing a first generally semi-spherical floating bushing, and the first generally semi-spherical floating bushing is coupled to the first clamp structure. The second clamp body portion includes a second clamp structure containing a second generally semi-spherical floating bushing, and the second generally semi-spherical floating bushing is coupled to the second clamp structure.

In some cases of the first embodiment, the clamp is further arranged to support a wireless networking device coupled to luminaire, wherein the luminaire is coupled to the generally cylindrical support structure. In these or other cases, the generally cylindrical support structure is a support arm of a luminaire, and the support arm is integrated with a light pole, and the support arm at least 25 feet above ground level.

In some cases of the first embodiment, the first clamp body portion is arranged for coupling to the second clamp body portion via gloved hands. In some cases of the first embodiment, first portion is an upper portion of the clamp and the second portion is a lower portion of the clamp. In some cases of the first embodiment, the clamp further includes at least one drop-prevention structure. In at least some of these cases, the at least one drop-prevention structure includes at least one lug arranged to receive a carabiner, hook, or cable-tie.

In some cases of the first embodiment, an outside surface of the first generally semi-spherical floating bushing has a first radius that is aligned with a radius of the generally cylindrical support structure and a second radius that is normal to the first radius. In at least some of these cases, a second outside surface of the second generally semi-spherical floating bushing has a third radius that is aligned with the radius of the generally cylindrical support structure and a fourth radius that is normal to the third radius. And in at least some of these cases, the first radius is about identical to the third radius and the second radius is about identical to the fourth radius.

In some cases of the first embodiment, the first generally semi-spherical floating bushing has a first inside surface, and the first inside surface has a first planar region and a second planar region. In some of these cases, the second generally semi-spherical floating bushing has a second inside surface, the second inside surface has a third planar region and a fourth planar region, the third planar region is arranged to oppose the first planar region of the first generally semi-spherical floating bushing when the first clamp body portion is coupled to the second clamp body portion about the generally cylindrical support structure, and the fourth planar region is arranged to oppose the second planar region of the first generally semi-spherical floating bushing when the first clamp body portion is coupled to the second clamp body portion about the generally cylindrical support structure.

In some cases of the first embodiment, the first clamp structure has a generally semi-spherical inside surface arranged to mate with an outside surface of the first generally semi-spherical floating bushing, and the second clamp structure has a generally semi-spherical inside surface arranged to mate with an outside surface of the second generally semi-spherical floating bushing. In some of these cases or other cases of the first embodiment, the clamp includes at least one spacer, and the at least one spacer arranged for placement between the first clamp structure and a wireless networking device coupled to a luminaire.

In a second embodiment, a clamping method includes the acts of positioning a first clamp body portion via one or more gloved hands about a generally cylindrical support structure; positioning a second clamp body portion via the one or more gloved hands about the generally cylindrical support structure in opposition to the first clamp body portion; and removably coupling the first clamp body portion to the second clamp body portion via the one or more gloved hands, wherein the first clamp body portion includes a first clamp structure containing a first generally semi-spherical floating bushing, the first generally semi-spherical floating bushing coupled to the first clamp structure, and wherein the second clamp body portion includes a second clamp structure containing a second generally semi-spherical floating bushing, the second generally semi-spherical floating bushing coupled to the second clamp structure.

In some cases of the second embodiment, the clamping method further includes coupling a first tether structure to a first drop-prevention structure of the first clamp body portion prior to positioning the first clamp body portion about the generally cylindrical support structure; coupling a second tether structure to a second drop-prevention structure of the second clamp body portion prior to positioning the second clamp body portion about the generally cylindrical support structure; and removing the first and second tether structures from the first and second drop-prevention structures, respectively, after removably coupling the first clamp body portion to the second clamp body portion.

In some cases of the second embodiment, the generally cylindrical support structure is a support arm of a luminaire, the support arm integrated with a light pole, the support arm at least 25 feet above ground level.

In a third embodiment, a clamping system includes a first clamp body portion, the first clamp body portion having a first clamp structure and the first clamp structure having a first generally semi-spherical floating bushing, wherein the first generally semi-spherical floating bushing includes a first inside surface having a first planar region and a second planar region; and a second clamp body portion, the second clamp body portion having a second clamp structure and the second clamp structure having a second generally semi-spherical floating bushing, wherein the second generally semi-spherical floating bushing includes a second inside surface having a third planar region and a fourth planar region, the third planar region arranged to oppose the first planar region when the first clamp body portion is coupled to the second clamp body portion about a generally cylindrical support structure, and the fourth planar region arranged to oppose the second planar region when the first clamp body portion is coupled to the second clamp body portion about the generally cylindrical support structure.

In some cases of the second embodiment, the clamping system also includes a first float coupling arranged to movably couple the first generally semi-spherical floating bushing to the first clamp structure; and a second float coupling arranged to movably couple the second generally semi-spherical floating bushing to the second clamp structure. In these and some other cases, the clamping system includes at least one coupling sub-system having a threaded rod structure and a corresponding nut structure, one of the threaded rod structure and the corresponding nut structure integrated with one of the first clamp body portion and the second clamp body portion and the other of the threaded rod structure and the corresponding nut structure integrated with the other of the first clamp body portion and the second clamp body portion.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
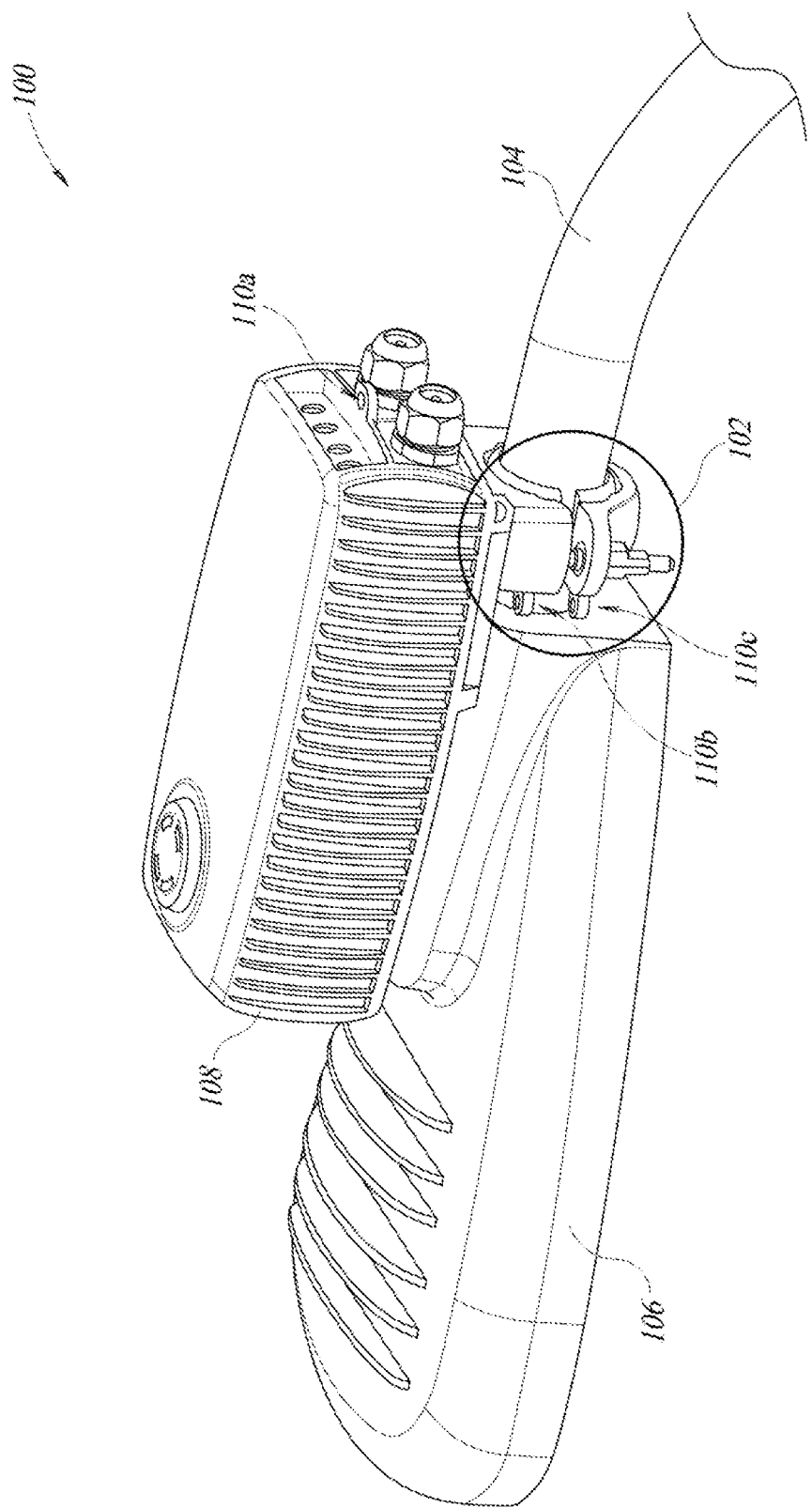
FIG. 1 is a system that deploys an embodiment of an inventive pole clamp.

The present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring more detailed descriptions of the embodiments.

The device, method, and system embodiments described in this disclosure (i.e., the teachings of this disclosure) improve known clamps, vises, grips, presses, braces, clasps, brackets, fasteners, and other such binding means that are arranged to removably or fixedly couple, fasten, secure, fix, clinch, clench, squeeze, press, grip, hold, brace, or otherwise immobilize an object relative to a pole, pipe, cable, or other generally cylindrical structure.

In at least some embodiments, but not all embodiments, the generally cylindrical structure will have a diameter between about two inches and about twelve inches. Cylindrical structures having smaller or larger diameters are of course contemplated. In at least some embodiments, the generally cylindrical structure will have a cross section having a circular shape, an ovular shape, a square shape, a triangular shape, a hexagonal shape, an octagonal shape, or some other regular shape.

The embodiments taught herein are directed towards a particular type of clamp. In some embodiments, the clamp includes a first clamp body portion arranged, via a gloved or ungloved hand, for removable coupling about a generally cylindrical support structure to a second clamp body portion. That is, the clamps of the present disclosure are so arranged that a user (e.g., a line worker, a powerline technician, an electrician, a streetlight installer, or the like) is able to install the clamp while bare-handed or while wearing the customary and ordinary gloves of his or her particular profession. The gloves may be leather gloves, rubber gloves, insulated gloves, protective gloves, synthetic gloves, or gloves of any other suitable form and function.

In at least some of clamp embodiments taught in the present disclosure, the first clamp body portion includes a first clamp structure containing a first generally semi-spherical floating bushing, which is coupled to the first clamp structure, and the second clamp body portion includes a second clamp structure containing a second generally semi-spherical floating bushing, which is coupled to the second clamp structure. The floating bushings permit one or more of the binding structures of the clamp to move laterally or rotationally, or both, within certain limits, and thereby form more direct binding to the generally cylindrical structure, improved alignment of the object to be clamped in any desirable direction, and provide yet additional benefits as will be described in the present disclosure.

FIG. 1 is a system 100 that deploys an embodiment of an inventive pole clamp taught in the present disclosure. The pole clamp 102 is coupled to a support arm 104, which is integrated into a light pole. The support arm 104 may support a luminaire 106 at about ten feet above the ground to about 100 feet above the ground (e.g., about 25 feet above the ground). In the embodiment of FIG. 1, the support arm 104 is generally arranged in a horizontal attitude, but the pole clamp 102 is not so limited. Pole clamp 102 embodiments may be mounted in any three-dimensional orientation. Accordingly, the pole clamp embodiments described herein may be mounted on any generally cylindrical support structure.

The pole clamp 102 embodiments taught in the present disclosure may be formed from any suitable materials using any suitable manufacturing processes. For example, various parts of the pole clamp embodiments may be cast, machined, forged, extruded, or formed in some other way. Different manufacturing processes may be used to create various parts of the pole clamp 102 embodiments. The various components of each pole clamp 102 embodiment may be formed using any one or more of metals, plastics, composites, alloys, or any other suitable material.

In at least one embodiment, various portions of the pole clamp are powder-coated with a polymer-based paint. In such circumstances, when the clamp portions are tightened together by applying an appropriate torque to certain threaded nut portions that are positioned on corresponding threaded rod portions, the threaded rod portions with undergo an acceptable amount of stretching. Subsequently, as the polymer-based paint "oozes," the stretched threaded rod portions will return toward the un-stretched dimension and while keeping the clamped portions tightened together. Different types of paints, lacquers, plating, and other such finishes are of course contemplated.

A luminaire 106 is attached to the end of the support arm 104 by a means that is outside the scope of the present disclosure. The support arm 104 of FIG. 1 is a generally horizontal arm, with respect to the earth, and the support arm 104 arranged (e.g., integrated, formed, mounted, or the like) generally normal to a vertical pole or other support structure. In many cases, the support arm is referred to as a generally horizontal arm, a horizontal arm, a horizontal support, an arm, or some other like term. In at least some cases, the support arm 104 has a generally cylindrical form and a generally circular cross section, which is a pole, or which may be approximated as a pole. Along these lines, embodiments of the pole clamp 102 of the present disclosure may be deployed on any suitable support structure.

The luminaire 106 in many cases includes a light emitting diode (LED) light source, which is electronically and communicatively controllable by a networking device 108 or some other light control device. In other cases, the luminaire 106 may include an incandescent light source, a halogen light source, a metal halide light source, a sodium vapor discharge light source, fluorescent light source, neon light source, or a light source having some other suitable medium for generating light. Generally, a networking device, such as networking device 108, will be mounted in proximity (e.g., above or below the luminaire or in some other nearby by location) to a luminaire. In the embodiment of FIG. 1, the networking device 108 is electromechanically coupled to a receptacle (e.g., a socket) on the top of the luminaire 106. The receptacle on the luminaire 106 and the plug on the networking device 108 comply with a published National Electrical Manufacturers Association (NEMA) interface. Certain ones of NEMA's interfaces comply with standards administered by the American National Standards Institute, and at least some of these are directed toward Roadway and Area Lighting Equipment and are referred to as ANSI C136 standards. At least one NEMA standard, referred to as ANSI C136.41, is directed to external locking type photo-control devices for street and area lighting. The interface between the luminaire 106 and the networking device 108 may be compliant with an ANSI C136 standard.

The pole clamp 102 is further arranged to support the networking device. Various support embodiments are further discussed in the present disclosure.

It has been learned by the present inventors that recent safety standards appear to have accelerated the implementation of formal dropped object prevention programs. To comply with such programs, the pole clamp 102 and the networking device 108 are each arranged with at least one drop-prevention structure 110. The networking device drop-prevention structure 110a is formed on a back side of the networking device 108. A first pole clamp drop-prevention structure 110b is formed on the first clamp body portion 120 (FIG. 2) of the pole clamp 102, and a second pole clamp drop-prevention structure 110c is formed on the second clamp body portion 160 (FIG. 2) of the pole clamp 102. For the sake of simplicity, a drop-prevention structure 110a-110c may be referred to herein as a drop-prevention structure 110. The drop-prevention structures 110 of FIG. 1 are formed as one or more lugs each arranged to receive a connecting means such as a carabiner, a hook, a cable tie, or some other connecting means.

Figure 2:
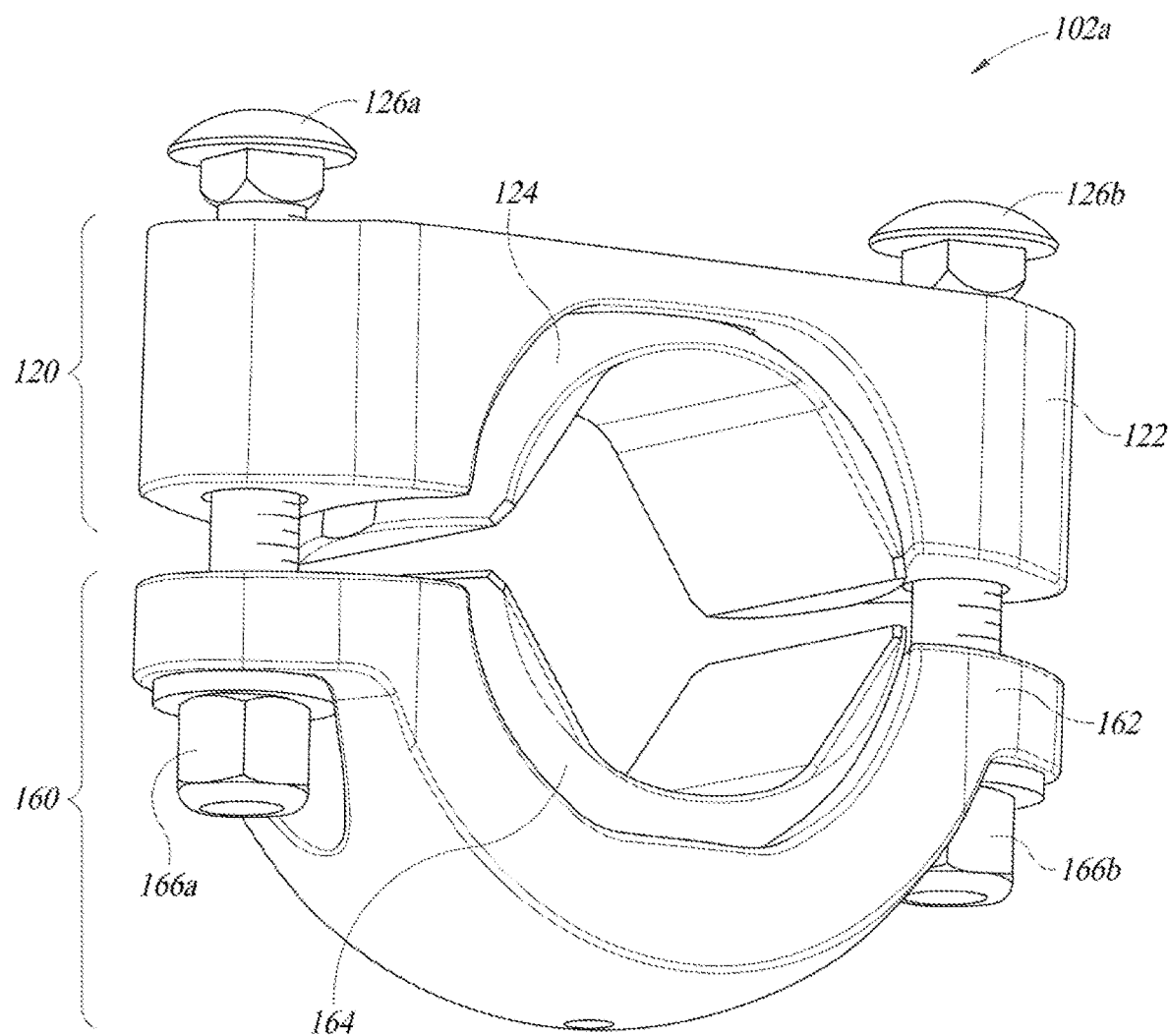
FIG. 2 is an embodiment of a pole clamp in more detail.

FIG. 2 is an embodiment of a pole clamp 102a in more detail. The pole clamp 102a is formed by coupling a first clamp body portion 120 to a second clamp body portion 160. The components of the pole clamp 102a are arranged for such coupling via an ungloved hand or via a gloved hand of the type that would be worn by a line worker, electrical power technician, streetlight installer, or the like. The first clamp body portion 120 includes a first clamp structure 122, which contains or otherwise supports a first generally semi-spherical floating bushing 124. The second clamp body portion 160 includes a second clamp structure 162, which contains or otherwise supports a second generally semi-spherical floating bushing 164.

In the embodiment of FIG. 2, the first clamp body portion 120 is removably coupleable to the second clamp body portion 160 via at least one coupling sub-system. The coupling sub-system of FIG. 2 includes a first threaded rod portion 126a and a correspondingly threaded first nut portion 166a, and via a second threaded rod portion 126b and a correspondingly threaded second nut portion 166b. In at least some cases, such as the pole clamp 102a of FIG. 2, the first and second threaded rod portions 126a, 126b are carriage bolts having an outside nominal diameter of at least three eights of an inch (⅜ in.). In at least some of these cases, the first and second threaded nut portions 166a, 166b are hexagonal steel nuts having an inside nominal diameter of at least three eights of an inch (⅜ in.) and similarly sized to the corresponding threaded rod portions 126a, 126b. Other dimensions and units (e.g., U.S. English units, metric units, or the like) are of course contemplated (e.g., three sixteenths inch (³⁄₁₆ in.), one fourth inch (¼ in.), five sixteenths inch (⁵⁄₁₆ in.)).

In at least some cases, the first clamp structure 122 includes anti-rotation shaped repositories (not shown in FIG. 2) to receive the square-shaped portion of the carriage bolt and thereby prevent rotation when the corresponding threaded nut portions 166a, 166b are tightened. In at least some cases, the coupling sub-system may include one or more anti-backout devices (e.g., plastic washer, nylon washer, or the like). In other cases, the coupling sub-system will include a rotational lever-lock, a cotter and cooperating cotter pin, or other like coupling means.

Figure 3:
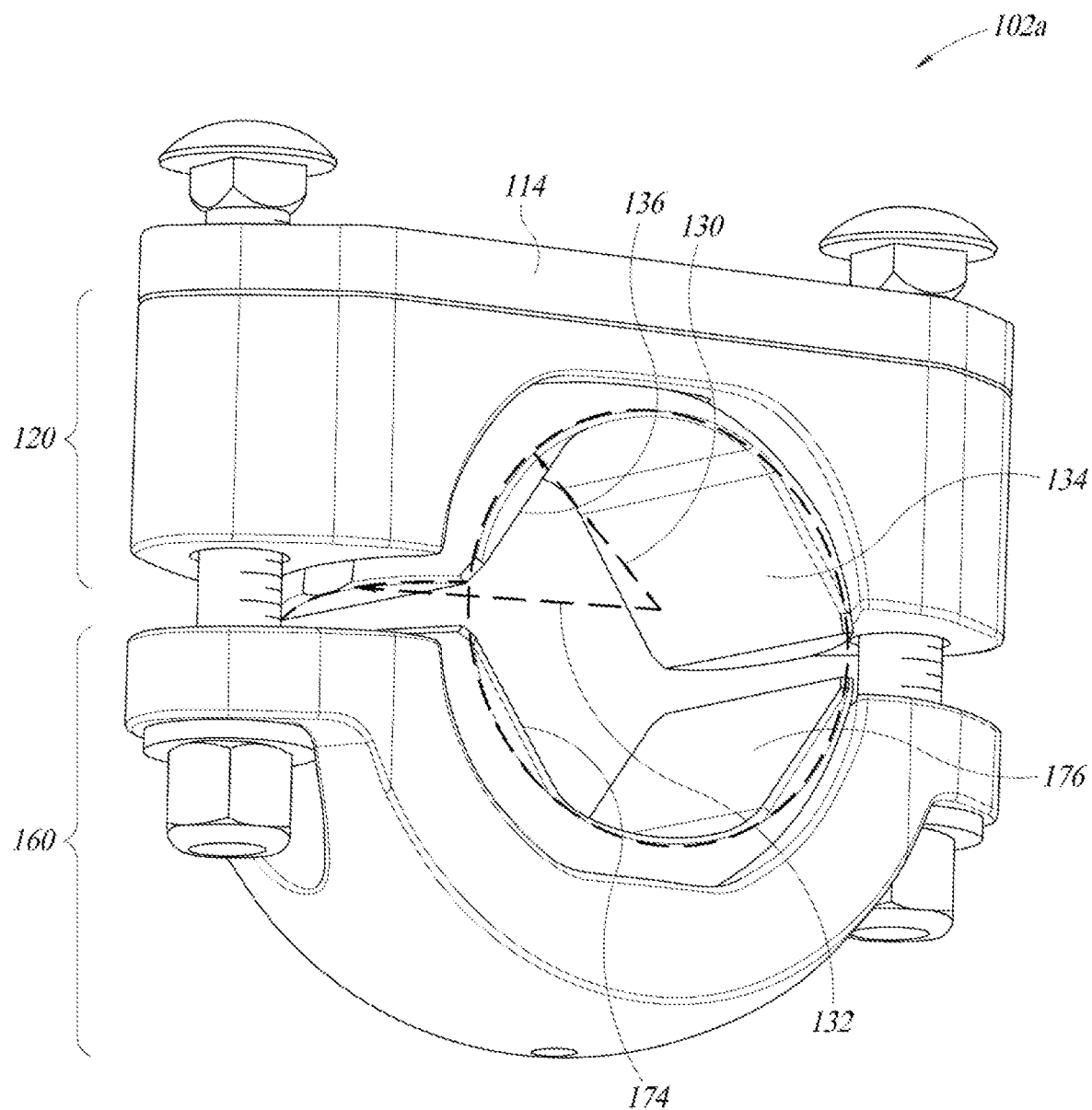
FIG. 3 is the pole clamp embodiment of FIG. 2 with additional detail.

FIG. 3 is the pole clamp 102a embodiment of FIG. 2 with additional detail shown. Certain structures of the pole clamp 102a in FIG. 3 are not re-identified to avoid unnecessarily cluttering the figure.

The pole clamp 102a includes an optional spacer 114. The spacer 114, when deployed, will act to change (e.g., raise) the operational height of the pole clamp 102a to alight the networking device into a generally horizontal attitude with respect to the earth. Accordingly, in some cases, the one or more spacers 114 may be arranged for coupling between the first clamp structure 122 and a wireless networking device 108 coupled to a luminaire 106. In some cases each spacer 114 may be a same height (e.g., ¼ in., ⅜ in., ½ in., or some other dimension). In other cases, different spacers 114 will have different heights. Each spacer 114 in some cases is suitably arranged with apertures (e.g., holes, slots, or the like) to be contained by the first and second threaded rod portions 126a, 126b of the coupling sub-system.

When the pole clamp 102a is deployed, inside surfaces of the first and second generally semi-spherical floating bushings 124, 164 are arranged to securely bind to the generally cylindrical support structure (e.g., support arm 104 in FIG. 1) in a way that strongly resists rotation. To enable such binding, the outside surfaces of the first and second generally semi-spherical floating bushings 124, 164 are arranged to mate with inside surfaces of the first and second clamp structures 122, 162, respectively, in a particular way.

As shown in FIG. 3, the outside surface of the first generally semi-spherical floating bushing 124 has a first radius 130 that is aligned with a radius of the generally cylindrical support structure and a second radius 132 that is normal to the first radius 130. The second generally semi-spherical floating bushing 164 has similar radii, which are identified in FIG. 4. The first radius 130 may be any suitable radius that permits the pole clamp 102a to mate with a generally cylindrical support structure (e.g., support arm 104 in FIG. 1). Accordingly, in at least some embodiments, the first radius 130 may be between about one inch (1.0 in.) and about twelve inches (12.0 in.). Other larger and smaller sizes are of course contemplated, and the first radius or any other dimensions of pole clamp 102a embodiment are not a limitation to the teachings of the present disclosure.

The second radius 132 may be selected based on a width of the pole clamp embodiment, a diameter of the generally cylindrical support structure, and certain dimensions of the structure (e.g., the networking device 108) on which the pole clamp 108 will be deployed. In many cases a wider pole clamp embodiment 102a (e.g., greater than about twelve inches (12.0 in)) will have a larger second radius 132. On the other hand, in many cases, the first radius 130 and the second radius 132 will have the same size or about the same size. Accordingly, while the first and second radii 130, 132 may have the same size, the pole clamp embodiments of the present disclosure do not require the first and second radii 130, 132 to have the same size.

Each of the first and second generally semi-spherical floating bushings 124, 164 have two generally planar regions on their inside surfaces. When the pole clamp 102a is viewed from the front or back, along the axis of the generally cylindrical support structure, the two planar surfaces of the first clamp structure 122 form opposing sides of a first trapezoidal shape, and the two planar surfaces of the second clamp structure 162 form opposing sides of a second trapezoidal shape.

A first planar region 134 of the first generally semi-spherical floating bushing 124 is identified in FIG. 3.

A second planar region 136 of the first generally semi-spherical floating bushing 124 is identified in FIG. 3.

A third planar region 174 of the second generally semi-spherical floating bushing 164 is identified in FIG. 3.

A fourth planar region 176 of the second generally semi-spherical floating bushing 164 is not identified in FIG. 3.

After the first and second clamp body portions 120, 160 are placed about the generally cylindrical support structure, the first and second portions of the coupling sub-system are tightened. When the coupling sub-system is tightened, the first planar region 134 will oppose the third planar region 174 and the second planar region 136 will oppose the fourth planar region 176. Due to the trapezoidal configuration of the two planar regions on each of the first and second generally semi-spherical floating bushings 124, 164, the forces applied through each of the two opposing planar regions will be generally symmetric. In addition, the generally symmetric forces applied through the first and second planar regions 134, 136 of the first generally semi-spherical floating bushing 124 will be exactly or about the same as the generally symmetric forces applied through the third and fourth planar regions 174, 176 of the second generally semi-spherical floating bushing 164. This binding by symmetrical forces will resist rotation of the pole clamp 102a around the generally cylindrical support structure. In some cases, each of the planar regions 134, 136, 174, 176 will contact a different portion of the generally cylindrical support structure at intervals of about 90 degrees. In other cases, the planar regions 134, 136, 174, 176 will contact a different portion of the generally cylindrical support structure at different angular intervals.

Also evident in FIG. 3, the first clamp structure 122 has a generally semi-spherical inside surface arranged to mate with an outside surface of the first generally semi-spherical floating bushing 124, and the second clamp structure 162 has a generally semi-spherical inside surface arranged to mate with an outside surface of the second generally semi-spherical floating bushing 176. The inventors have recognized significant benefits in these closely matched surfaces, which spread the clamping force in a generally even distribution throughout the pole clamp 102a, which permits the pole clamp 102 to securely and removably bind to the generally cylindrical support structure without substantial deformation of either the pole clamp 102a or the generally cylindrical support structure.

Figure 4:
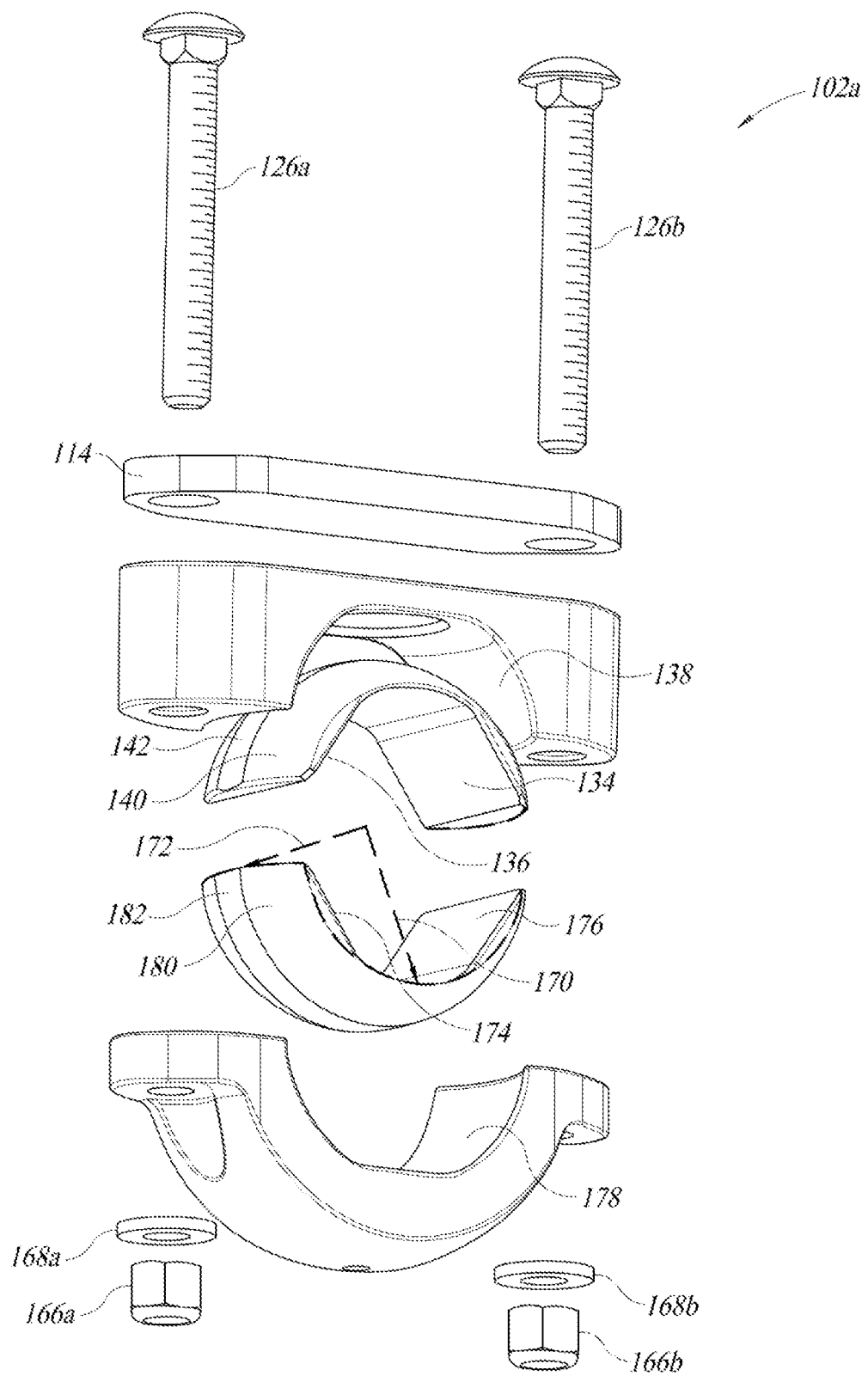
FIG. 4 is a break-out drawing of the pole clamp embodiment of FIG. 2 with additional detail.

FIG. 4 is a break-out drawing of the pole clamp 102a embodiment of FIG. 2 with additional detail. Certain structures of the pole clamp 102a in FIG. 4 are not re-identified to avoid unnecessarily cluttering the figure. The drawing identifies the first and second threaded rod portions 126a, 126b of the coupling sub-system, the first and second threaded nut portions 166a, 166b of the coupling sub-system, and first and second force distribution devices 168a, 168b (e.g., washers) of the coupling sub-system. The figure also identifies the spacer 114, with two visible apertures that are aligned with respective first and second threaded rod portions 126a, 126b.

First and second planar surfaces 134, 136, respectively, of the first generally semi-spherical floating bushing 124 are identified, and opposing third and fourth planar surfaces 174, 176, respectively of the second generally semi-spherical floating bushing 164 are identified.

Also evident in FIG. 4 are a third radius 170 of the second generally semi-spherical floating bushing 164 that is aligned with a radius of the generally cylindrical support structure, and a fourth radius 172 that is normal to the third radius 170. In some cases, the first radius 130 of the first generally semi-spherical floating bushing 124 is about identical to the third radius 170, and the second radius 132 of the first generally semi-spherical floating bushing 124 is about identical to the fourth radius 172.

In FIG. 4, the first clamp structure 122 has a generally semi-spherical inside surface 138 arranged to mate with an outside surface 140 of the first generally semi-spherical floating bushing 124. The second clamp structure 162 has a generally semi-spherical inside surface 178 arranged to mate with an outside surface 180 of the second generally semi-spherical floating bushing 164. Each of the first and second generally semi-spherical floating bushings 124, 164 has an optionally radially truncated portion 142, 182, respectively, formed on the outside surface 140, 180, respectively, of the first and second generally semi-spherical floating bushings 124, 164, respectively. The inventor has recognized that by truncating a portion of the one or both of the first and second generally semi-spherical floating bushings 124, 164, then the thickness of the first and second clamp structures 122, 162, respectively can be increased. The increased thickness of the first and second clamp structures 122, 162 may provide increased structural stability of the first and second clamp body portions 120, 160, respectively.

Figure 5:
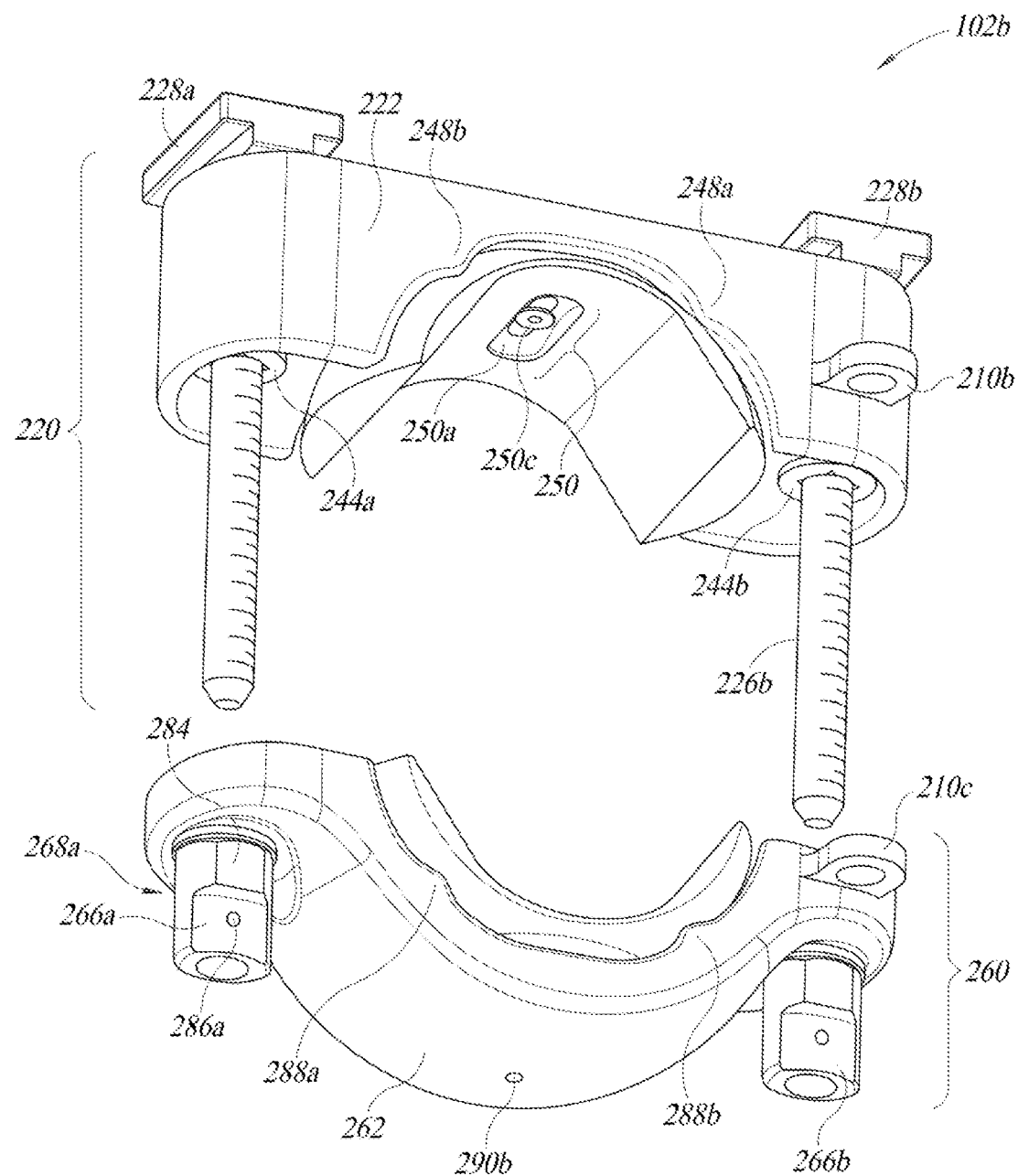
FIG. 5 is another embodiment of a pole clamp.

FIG. 5 is another embodiment of a pole clamp 102b. The pole clamp 102b is formed by coupling a first clamp body portion 220 to a second clamp body portion 260. The components of the pole clamp 102a are arranged for such coupling via an ungloved hand or via a gloved hand of the type that would be worn by a line worker, electrical power technician, streetlight installer, or the like. The first clamp body portion 220 includes a first clamp structure 222, which contains or otherwise supports a first generally semi-spherical floating bushing 224. The second clamp body portion 260 includes a second clamp structure 262, which contains or otherwise supports a second generally semi-spherical floating bushing 264. In at least some cases, the pole clamp 102b is thinner, lighter, and stronger than the pole clamp 102a of FIGS. 2 to 4.

The pole clamp 102b has another coupling subsystem which includes first and second threaded rod portions 226a, 226b, and first and second threaded nut portions 266a, 266b. The first and second threaded rod portions 226a, 226b include a shaped head 228a, 228b, respectively, arranged to cooperate with a corresponding receptacle (e.g., T-channel) of another structure mounted on or in proximity to the generally cylindrical support structure. In some cases, that other structure is a wireless networking device such as a networking device 108 (FIG. 1). In other cases, the other structure may be a different communications device, a telecommunications device (e.g., small cell), a light control device, a sign control device, an edge computing device, a Wi-Fi® (e.g., IEEE 802.11) device, or some other device. In at least some cases, the other structure is electromechanically coupled to a luminaire mounted on the generally cylindrical support structure.

The coupling sub-system of pole clamp 102b also includes first and second anti-backout structures 254a, 254b, which are arranged on the first and second threaded rod portions 226a, 226b, respectively. The anti-backout structures 254a, 254b may be formed as a disc, a washer, or some other shape. The anti-backout structures 254a, 254b may be formed of plastic, nylon, steel, or some other material. Prior to deployment, the anti-backout structures 254a, 254b are threaded or otherwise placed on the first and second threaded rod portions 226a, 226b to retain the threaded rod portions 226a, 226b in cooperation with the first clamp structure 222. In the event that one or both of the first and second threaded rod portions 226a, 226b need to be removed from the first clamp structure 222, the anti-backout structures 254a, 254b are removable with reasonable effort. On the other hand, the anti-backout structures 254a, 254b sufficiently couple the threaded rod portions 226a, 226b so that they are not accidentally or otherwise dropped from the first clamp body portion when the clamp is being deployed.

Figure 6:
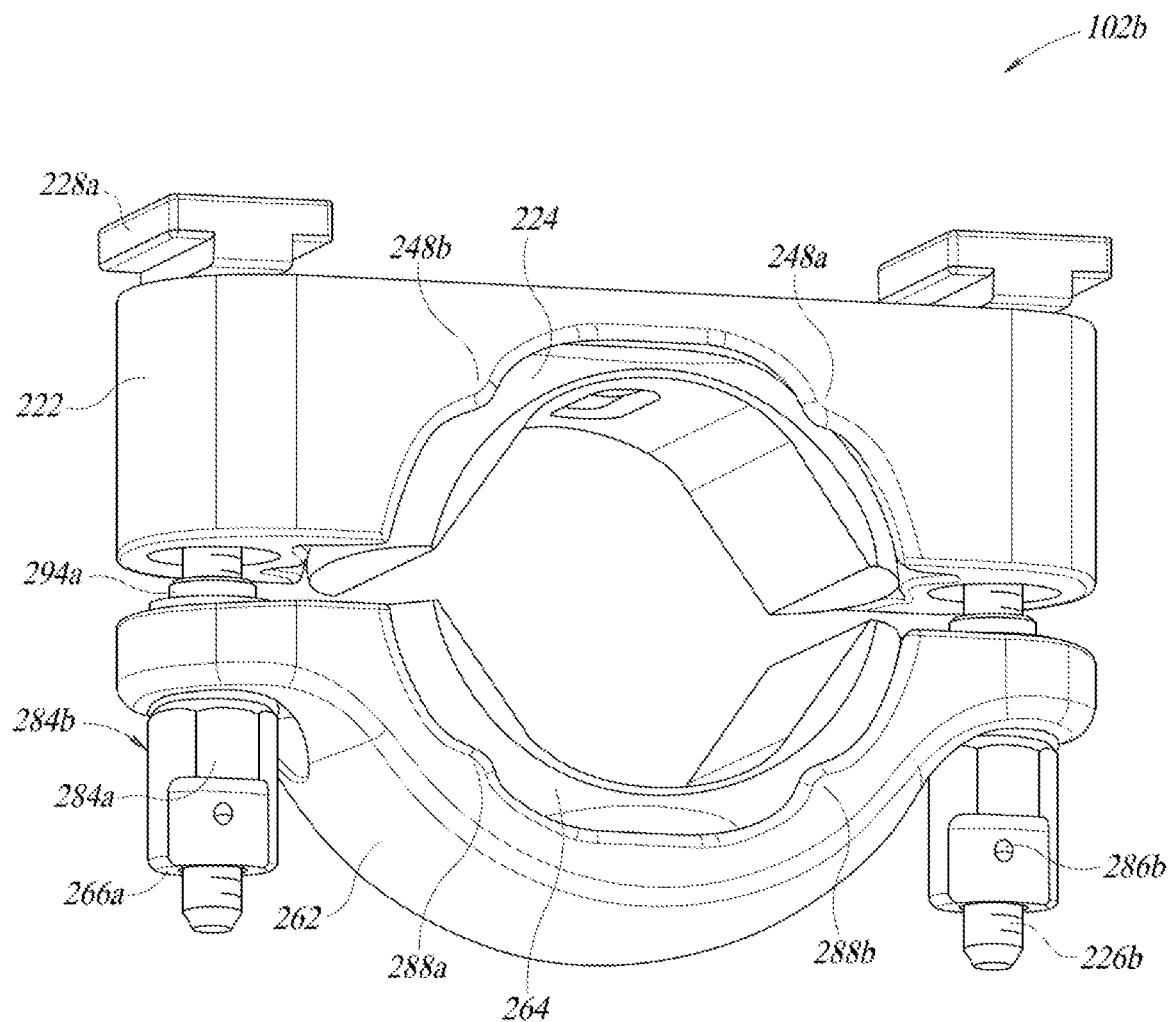
FIG. 6 is the pole clamp embodiment of FIG. 5 from a different perspective.

Further still, the first and second threaded nut structures 266a, 266b of the coupling sub-system are different from the first and second threaded nut structures 166a, 166b of the pole clamp 102a of FIGS. 2 to 4. As illustrated, each of the first and second threaded nut structures 266a, 266b includes at least two surfaces arranged to be grasped with the gloved hand 284 when the corresponding threaded nut structure 266a, 266b is rotated about the threaded rod portion 226a, 226b. In FIG. 5, due to the orientation of the threaded nut structure 266a, only a single surface arranged to be grasped with the gloved hand 284 is identified. As illustrated in FIG. 6, an opposite side of the threaded nut structure 266a will have a corresponding surface arranged to be grasped with the gloved hand 284. In some cases, the surface arranged to be grasped with the gloved hand 284 may be one or more of planar, concave, convex, knurled, plated, covered with a high friction material (e.g., rubber, silicone, a polymer such as polydimethylsiloxane (PDMS), or some other material). The surface arranged to be grasped with the gloved hand 284 may have an area of at least one-half square inches (0.5 sq. in.), one square inch (1.0 sq. in.), two square inches (2.0 sq. in.) or some other size. In at least some cases, the first and second threaded nut structures 266a, 266b will maintain a linear distance of at least one-half inch (0.5 in.), three-fourths of an inch (0.75 in.), one inch (1.0 in.) or some other distance from second clamp structure 262, which facilitates hand tightening of the first and second threaded nut structures 266a, 266b with a gloved hand.

Along the lines of the pole clamp 102a of FIGS. 2 to 4, the first and second threaded nut structures 266a, 266b may also have corresponding force distribution devices (e.g., a washer). A single force distribution device 268a is identified in FIG. 5.

Yet one more feature of the coupling sub-system of pole clamp 102b formed in each is of the first and second threaded nut structures 266a, 266b is at least one sighting aperture. The sighting aperture 286a in FIG. 5 is arranged to visually or tactilely expose at least a portion of the first threaded rod portion 226a when the corresponding first threaded nut portion 266a is rotated about the first threaded rod portion 226a. In at least some cases, visually or tactilely perceiving the first threaded rod portion 226a through the sighting aperture 286a indicates to a user deploying the pole clamp 102b that the first threaded nut structure 266a is sufficiently tightened to avoid failure at the junction of the threaded rod and threaded nut portions. Conversely, if the first threaded rod portion 226a is not perceived through the sighting aperture 286a, then user deploying the pole clamp may be informed that the associated first threaded nut structure 266a must be further tightened, or the associated first threaded rod portion 226a is not long enough to safely bind the pole clamp 102b to the generally cylindrical support structure.

The inside surfaces of the first and second generally semi-spherical floating bushings 224, 264 of the pole clamp 102b are along the lines the of inside surfaces of the first and second generally semi-spherical floating bushings 224, 264 of the pole clamp 102a in FIGS. 2 to 4. The planar regions of the first and second generally semi-spherical floating bushings 224, 264, and the corresponding trapezoidal shapes, are evident in FIGS. 5 to 10 and not further identified. Nevertheless, it is recognized that in the pole clamp 102b of FIG. 5, an inside surface of the first generally semi-spherical floating bushing 224 has at least two planar regions arranged to contact the generally cylindrical support structure when the first clamp body portion 220 is coupled to the second clamp body portion 260 about the generally cylindrical support structure. Along these lines, it is recognized that an inside surface of the second generally semi-spherical floating bushing 260 has a second plurality of planar regions, wherein various ones of the first plurality of planar regions are arranged to oppose various ones of the second plurality of planar regions.

Another difference in the pole clamp 102b of FIGS. 5 to 10 is a particular set of shoulder protuberances formed on each of the first clamp structure 222 and the second clamp structure 262. An inside surface of the first clamp structure 222 includes a first shoulder protuberance 258a arranged to apply force through at least one planar region of the first generally semi-spherical floating bushing 224 when the first clamp body portion 220 is coupled to the second clamp body portion 240 about the generally cylindrical support structure. The inside surface of the first clamp structure 222 also includes a second shoulder protuberance 258b arranged to apply force through at least one other planar region of the first generally semi-spherical floating bushing 224 when the first clamp body portion 220 is coupled to the second clamp body portion 240 about the generally cylindrical support structure. Correspondingly, the inside surface of the second clamp structure 262 also includes third and fourth shoulder protuberances 278a, 278b arranged to apply force through at least adjacent planar regions of the second generally semi-spherical floating bushing 264 when the first clamp body portion 220 is coupled to the second clamp body portion 240 about the generally cylindrical support structure.

The pole clamp 102a includes one or more drop-prevention structures. A first drop-prevention structure 210b is formed in the first clamp structure 222, and a second drop-prevention structure 210c is formed in the second clamp structure 262. The drop-prevention structures may be formed as lugs arranged to receive a connecting means such as a carabiner, a hook, a cable tie, or some other connecting means.

In the pole clamp 102b embodiment, each of the first and second generally semi-spherical floating bushings 224, 264 includes a float coupling arranged to movably couple the respective generally semi-spherical floating bushing 224, 264 to its respective first and second clamp structure 222, 262. In more detail, a first float coupling 250 includes a float coupling well 250a in the first generally semi-spherical floating bushing 224, a float coupling aperture 250b in the first clamp structure 222, and a float shaft 250c passing through the float coupling well 250a and threaded into the float coupling aperture 250b in the first clamp structure 222. In some embodiments, the second generally semi-spherical floating bushing 264 includes a second float coupling 290, the second float coupling 290 is arranged to movably couple the second generally semi-spherical floating bushing 264 to the second clamp structure 262. The second float coupling 290 includes a second float coupling well 290c in the second generally semi-spherical floating bushing 264, a second float coupling aperture 290b in the second clamp structure 262, and a second float shaft 290c passing through the second float coupling well 290a and threaded into the second float coupling aperture 290b in the second clamp structure 262.

FIG. 6 is the pole clamp 102b embodiment of FIG. 5 from a different perspective. Certain structures of the pole clamp 102b in FIG. 6 are not re-identified to avoid unnecessarily cluttering the figure.

In the embodiment of FIG. 6, the coupling sub-system is shown in more detail. The first shaped head 228 is represented as a "T" structure having about the same width as the first clamp structure 222. In other embodiments, the shaped head structures may be formed in a different way with a different shape, and the shaped head structures may have any suitable dimensions.

The first threaded rod portion 226a is also shown in more detail. In at least some embodiments, the threaded rod portions may include a bulleted, tapered, or otherwise formed distal end to facilitate coupling the first clamp structure 222 with the second clamp structure 262.

In some embodiments, the pole clamp 102b will include third and fourth anti-backout structures 294a, 294b, which are arranged in cooperation with the second clamp structure 262 and coupled to a respective threaded nut portion. In FIG. 6, the third anti-backout structure 294a is identified, and the third anti-backout structure 294a is coupled to the first threaded nut portion 266a.

Figure 7:
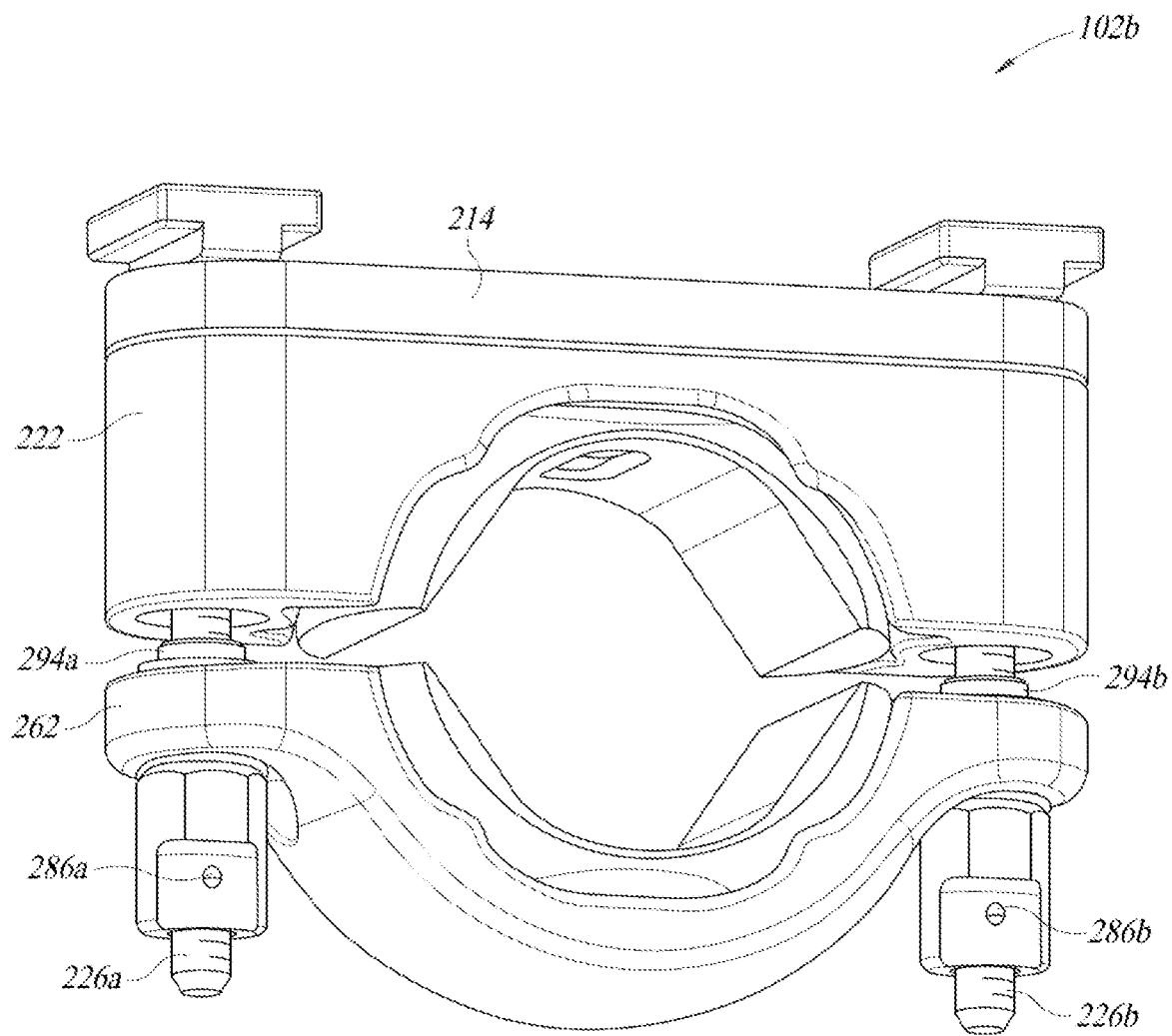
FIG. 7 is the pole clamp embodiment of FIG. 5 from a second different perspective.

FIG. 7 is the pole clamp 102b embodiment of FIG. 5 from a second different perspective. First and second sighting apertures 286a, 286b are identified, and third and fourth anti-backout structures 294a, 294b are identified. An optional spacer 214 is also identified. It is evident in the pole clamp 102b embodiment of FIG. 7 that the coupling junction between the pole clamp 102b and a structure mounted on or in proximity to the generally cylindrical support structure can be changed by the addition of any suitable number of optional spacers 214. Alternatively, or in addition, optional spacers 214 of any suitable dimension may be included in some embodiments. In these cases, the first clamp body portion 220 should be suitably arranged with first and second threaded rod portions 226a, 226b of an appropriate length to allow clamping of the first clamp structure 222 to the second clamp structure 262 that allows visual or tactile locating of the respective first and second threaded rod portions 226a, 226b in the corresponding first and second sighting apertures 286a, 286b.

Figure 8:
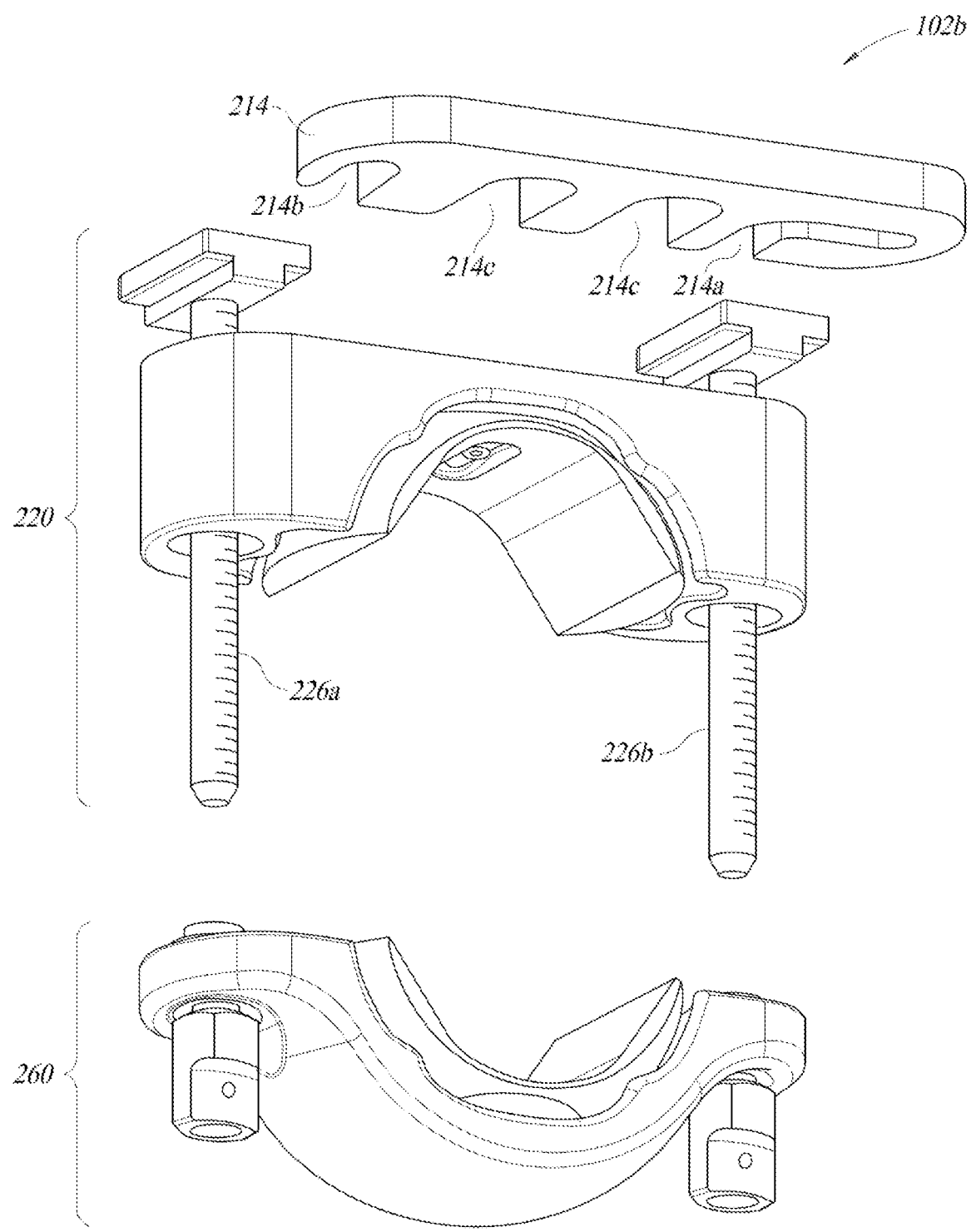
FIG. 8 is a break-out drawing of the pole clamp embodiment of FIG. 5 with additional detail.

FIG. 8 is a break-out drawing of the pole clamp 102b embodiment of FIG. 5 with additional detail. An optional spacer 214 is separated from the first and second threaded rod portions 226a, 226b, but it is evident that during deployment of the pole clamp 102b, a first shaped alignment slot 214a of the spacer 214 may be movably arranged on the second threaded rod portion 226b, and the spacer 214 may then be rotated to arrange the second alignment slot 214b on the first threaded rod portion 226a. The spacer 214 includes any suitable number of weight reduction features 214c. The weight reduction features 214c may include an absence of spacer material in some portion of the spacer 214 that will not detrimentally reduce the working strength of the spacer 214. In at least some cases, the weight reduction features 214c facilitate more confident handling of the spacer 214 with a gloved hand.

In the embodiment of FIG. 8, it is evident that a complete pole clamp 102b embodiment may comprise three parts: a spacer 214, a first clamp body portion 220 multi-part assembly, and a second clamp body portion 260 multi-part assembly.

Figure 9A:
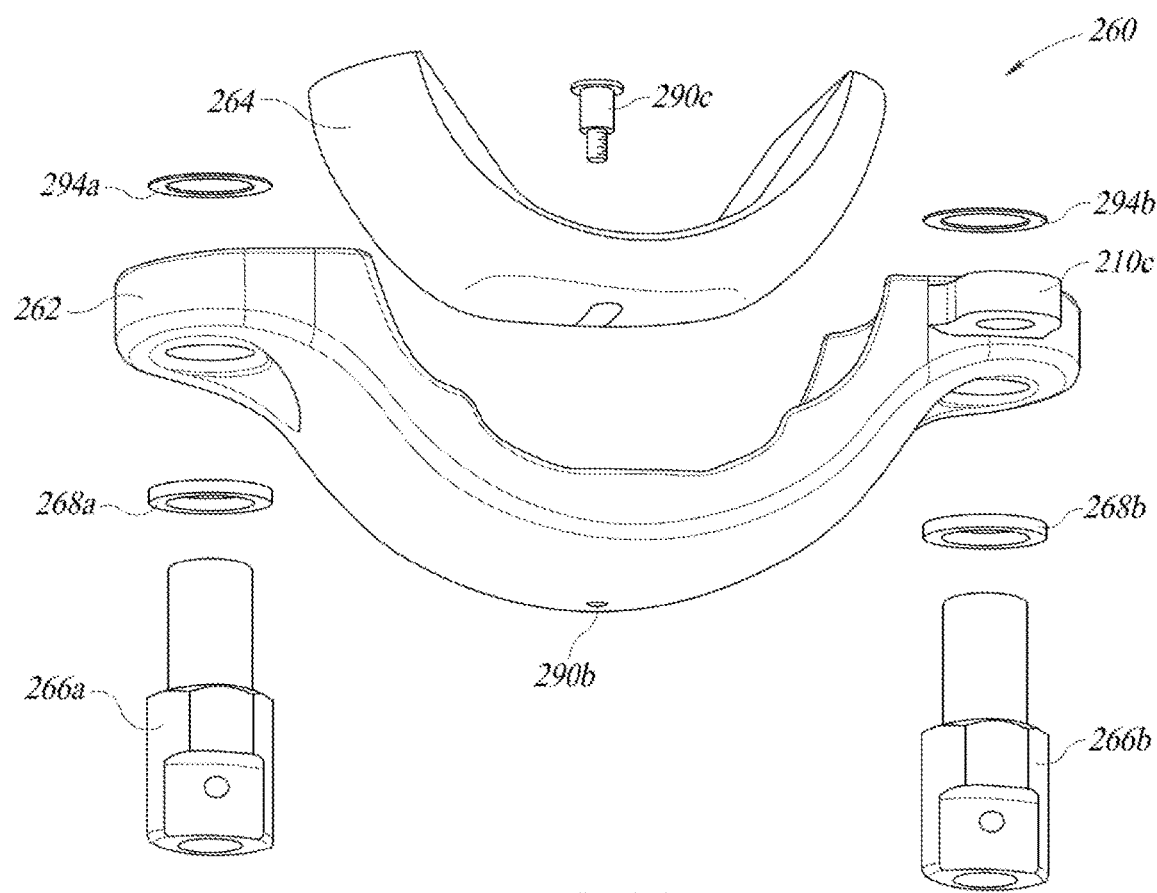
FIG. 9A is an assembly drawing for a second clamp body portion of a pole clamp embodiment.
Figure 9B:
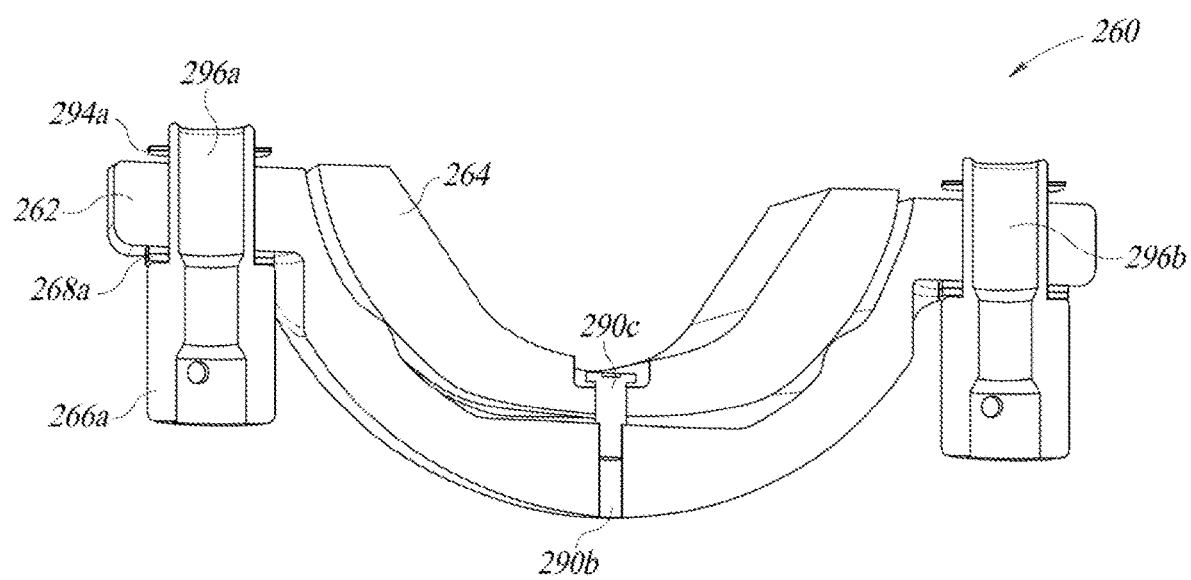
FIG. 9B is a cross section of the second clamp body portion of FIG. 9A.

FIG. 9A is an assembly drawing for a second clamp body portion 260 of a pole clamp 102b embodiment. FIG. 9B is a cross section of the second clamp body portion 260 of FIG. 9A. FIGS. 9A and 9B may collectively be referred to as FIG. 9.

In the second clamp body portion 260, a second clamp structure 262 includes a second generally semi-spherical floating bushing 264, which is coupled to the second clamp structure 262 via a second float coupling 290. The floating bond between the second generally semi-spherical floating bushing 264 and the second clamp structure 262 is formed by threading a second float shaft 290c through a second float coupling well 290a and into a second float coupling aperture of the second clamp structure 262. In addition, the coupling subsystems are shown in more detail having, respectively, first and second threaded nut portions 266a, 266b, first and second force distribution devices 268a, 268b, and third and fourth anti-backout structures 294a, 294b.

In at least some cases, the first and second force distribution devices 268a, 268b are wedge lock washers. In other cases, the first and second force distribution devices 268a, 268b may be split washers, star-type washers, spring washers (e.g., BELLEVILLE® washers), or some other type of force distribution device. When the pole clamp 102b is deployed, the first and second force distribution devices 268a, 268b provide tension against the first and second threaded nut portions 266a, 266b, respectively, to maintain the coupling of the first clamp body portion 220 to the second clamp body portion 260.

In at least some cases, third and fourth anti-backout structures 294a, 294b are formed as push nuts. The push nuts may be formed of stainless steel, brass, aluminum, zinc, plastic, nylon, or some other material. The push nuts may include a flange formed on the inside diameter to permit easy friction entry of the push nut onto a shaft of the corresponding threaded nut portion, and more difficult friction exit of the push nut from the shaft of the corresponding threaded nut portion. When the third and fourth anti-backout structures 294a, 294b are arranged on the respective first and second threaded nut portions 266a, 266b, the first and second threaded nut portions 266a, 266b may be permitted to freely rotate without easily falling from the second clamp structure 262 or being pulled from the second clamp structure 262. Other anti-backout structures are contemplated.

In some optional embodiments, the first and second threaded nut portions 266a, 266b are formed with respective first and second cylindrical guides 296a, 296b. The first and second cylindrical guides 296a, 296b may be formed having an inside diameter only slightly larger (e.g., 1/64 of an inch, 1/32 of an inch, 1/16 of an inch, or some other size) than the outside diameter of the respective first and second threaded rod portions 226a, 226b. In some optional embodiments, the first and second cylindrical guides 296a, 296b include a taper at their distal end to facilitate entry of a respective first and second threaded rod portion 226a, 226b having a bulleted, tapered, or otherwise formed distal end. Accordingly, the first and second threaded nut portions 266a, 266b may be formed having self-alignment features that more easily facilitate coupling of the first clamp body portion 220 to the second clamp body portion 260.

Figure 10:
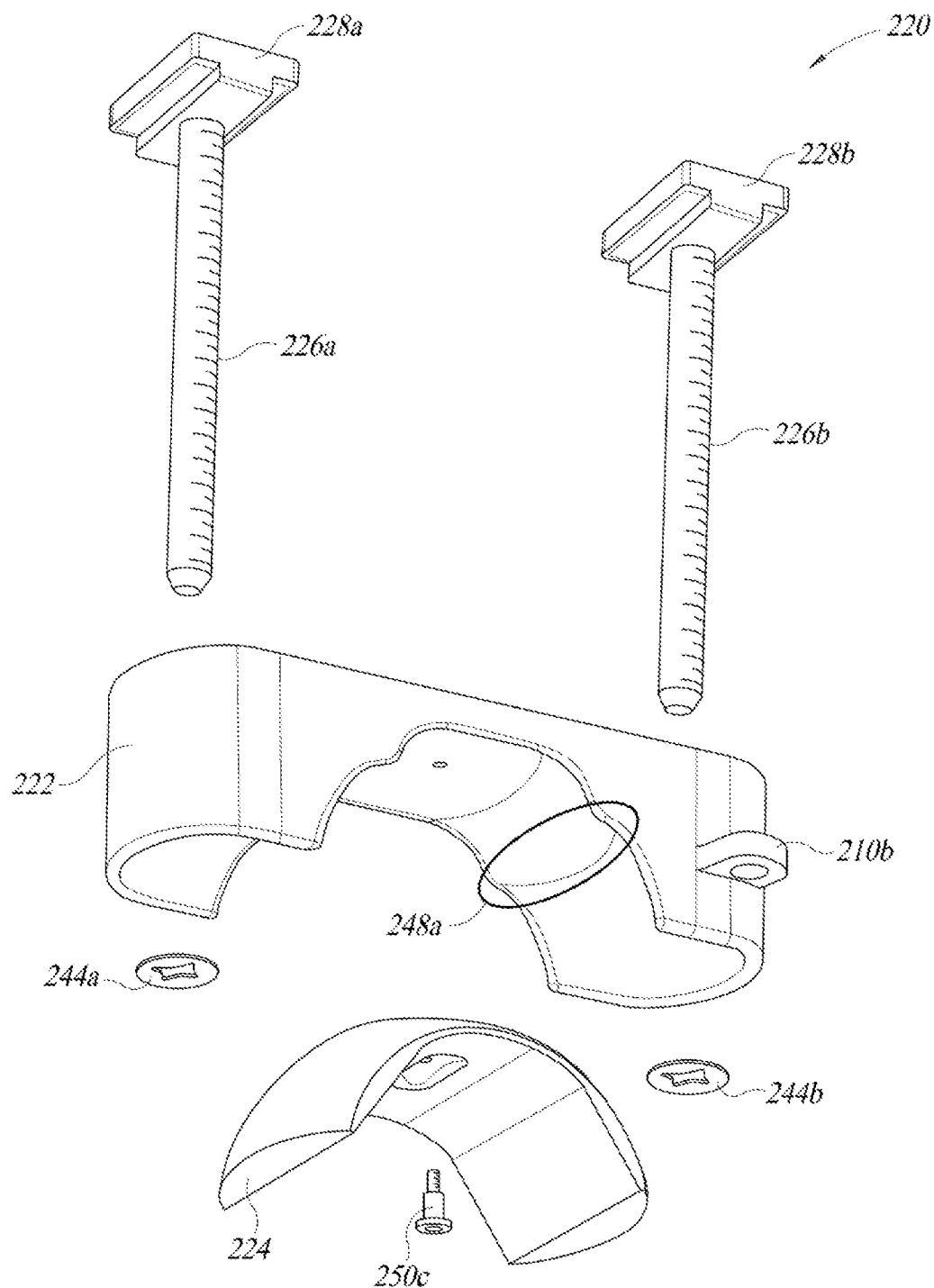
FIG. 10 is an assembly drawing for a first clamp body portion of a pole clamp embodiment.

FIG. 10 is an assembly drawing for a first clamp body portion 220 of a pole clamp 102b embodiment. In the embodiment, the first and second threaded rod portions 226a, 226b are identified, and the first and second shaped heads 228a, 228b are identified. In at least some embodiments, the threaded rod is three eighths inch (3/8 in.), sixteen threads per inch hardened stainless steel (e.g., 316 SS) threaded rod. In some embodiments, the first and second shaped head assemblies 228a, 228b are threaded "T-nut" components, and the threaded rod and shaped head assemblies are bound and tightened with particular tightening thread compound (e.g., LOCTITE RED®).

Also in the embodiment of FIG. 10, the first and second threaded rod portions 226a, 226b are passed through the first clamp structure 222 and retained in the first clamp structure 222 by respective first and second anti-backout structures 244a, 244b. The anti-backout structures may be bolt retainers formed from plastic, nylon, brass, steel, or some other material. In at least some cases, the anti-backout structures are threaded onto the threaded rod portions. In at least some other cases, the anti-backout structures are friction fit on the threaded rod portions. Other coupling techniques are contemplated.

Also identified in the first clamp body portion 220 of FIG. 10 are the first drop-prevention structure 210b, the first shoulder protuberance 248a, the first generally semi-spherical floating bushing 224, and the first float shaft 250c. The first shoulder protuberance 248a is formed as a semi-circular shoulder that spans the width of the first clamp structure 222. When assembled, a symmetrical force is applied through the first and second planar portions of the first generally semi-spherical floating bushing 224.

Figure 11A:
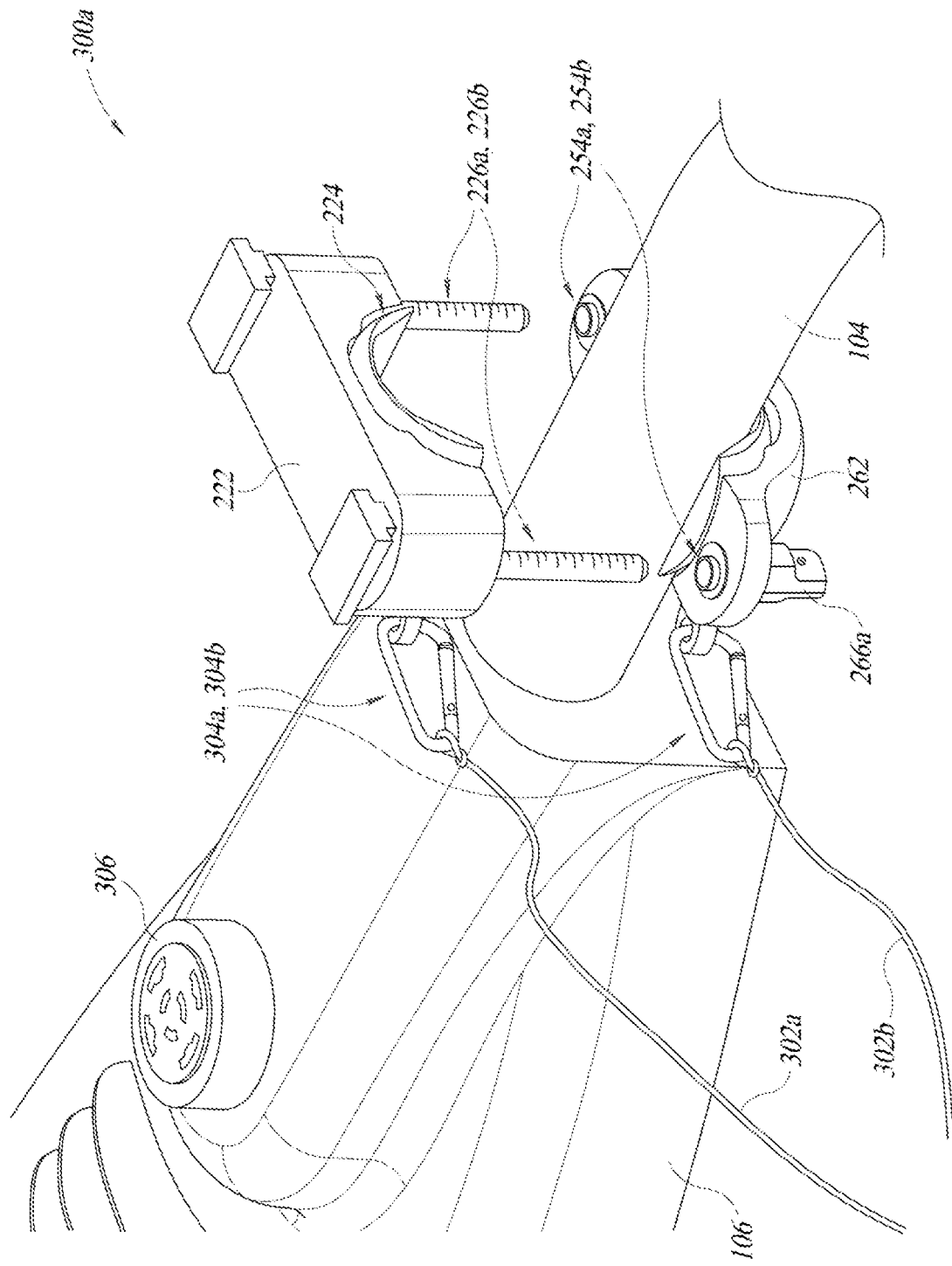
FIG. 11A is a pole clamp embodiment during deployment on a generally cylindrical support structure.

FIG. 11A is a pole clamp 102b embodiment during deployment 300a on a generally cylindrical support structure 104. A luminaire 106 is mounted to a distal end of the generally cylindrical support structure 104. The luminaire 106 includes a NEMA receptacle 306, which may receive a device such as the networking device 108 of FIG. 1.

In the deployment 300a, a user, who may be a line worker, electrical power technician, streetlight installer, or some other user will often be wearing work gloves of the reasonable and customary type when deploying the pole clamp 102b. The user has attached a first device locking means 304a (e.g., a carabiner, a clip, a hook, a tie-off, or the like) to a distal end of a first tether 302a, and the user has attached a second device locking means 304b to a distal end of a second tether 302b. The proximal ends of the first and second tethers 302a, 302b may be attached to the user, to a bucket loader or some other work equipment, or to some other device that would prevent a tool or piece of equipment from reaching the ground if the tool or piece of equipment coupled to the distal end of the locking means 304a, 304b were to fall. In the deployment 300a, the first locking means 304a is coupled to a drop-prevention structure 210b of the first clamp body portion 220, and the second locking means 304b is coupled to a drop-prevention structure 210c of the second clamp body portion 260.

During the deployment 300a, the user will position the first clamp body portion 220 on top of the generally cylindrical support structure 104, and the user will position the second clamp body portion 260 below the generally cylindrical support structure 104. The user will then align the first and second threaded rod portions 226a, 226b with respective first and second cylindrical guides 296a, 296b (FIG. 9) of the first and second threaded nut portions 266a, 266b. The user will hand tighten the first and second threaded nut portions 266a, 266b. Subsequently, the user may electromechanically couple a device such as the networking device 108 (FIG. 1) to the NEMA receptacle 306, and then the user may rotate the first and second shaped heads 228a, 228b of the first and second threaded rod portions 226a, 226b, respectively. Optional spacers 214 may be added, the components aligned, and the first and second threaded nut portions 266a, 266b tightened. After such tightening, the user will remove the first and second device locking means 304a, 304b.

Figure 11B:
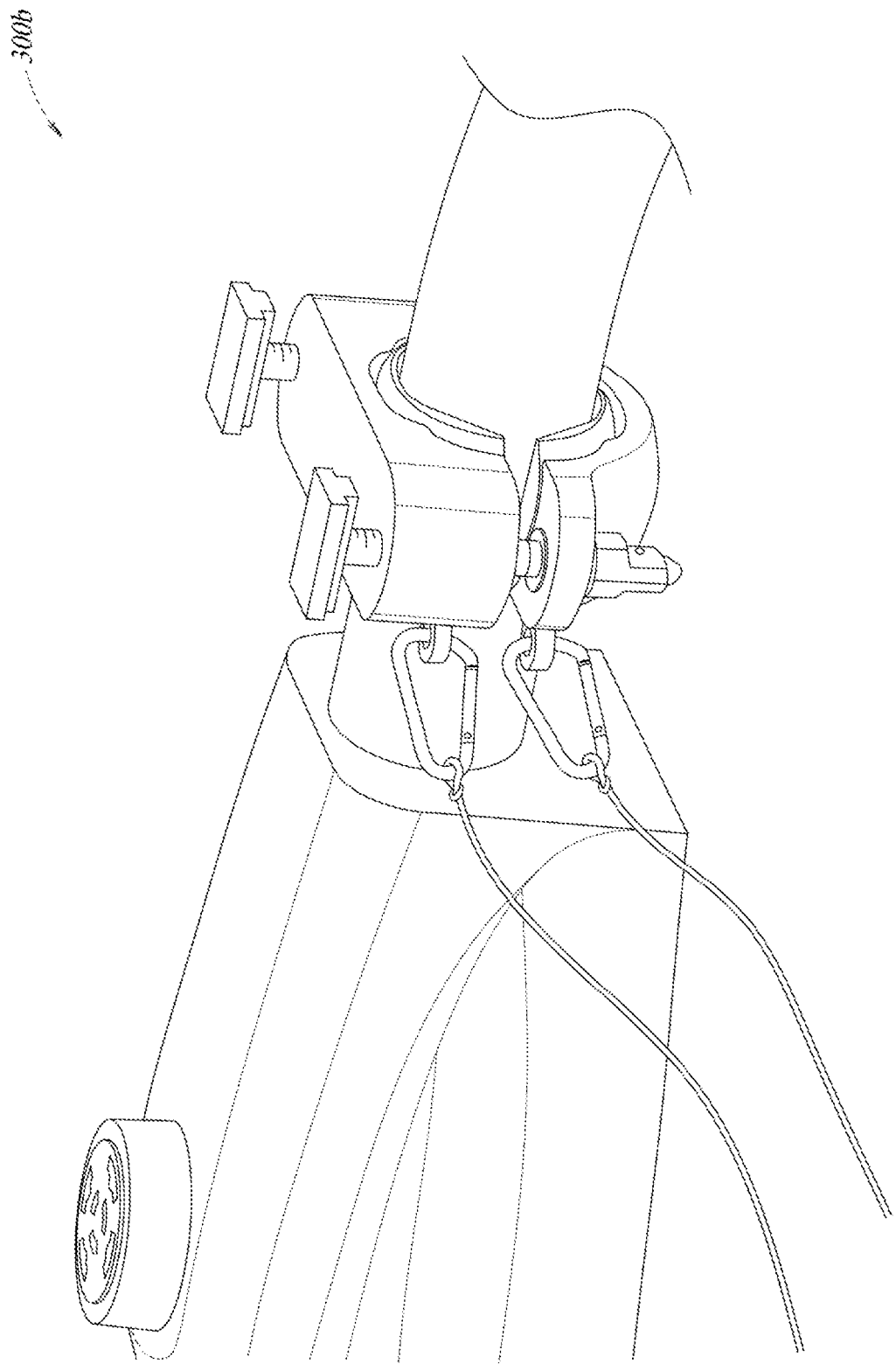
FIG. 11B is the pole clamp embodiment during deployment.

FIG. 11B is the pole clamp 102b embodiment during deployment 300b. Collectively, FIGS. 11A and 11B may be referred to herein as FIG. 11. In FIG. 11B, the pole clamp 102b has been hand tightened, with a user's gloved hand, onto the generally cylindrical support structure 104.

FIGS. 12A-12D show a spacer deployment 300c in four distinct acts. Collectively, FIGS. 12A to 12D may be referred to herein as FIG. 12. In the spacer deployment 300c, a pole clamp 102b has been hand tightened on a generally cylindrical support structure 104. Concurrently, a networking device 108 has been electromechanically coupled to a luminaire 104. The first and second shaped heads 228a, 228b (not identified in FIG. 12) have been coupled to the networking device 108. A user desires to horizontally align the networking device 108 via deployment (e.g., use) of an optional spacer 214. An embodiment of the optional spacer 214 of FIG. 12 is shown in FIG. 8.

Figure 12A:
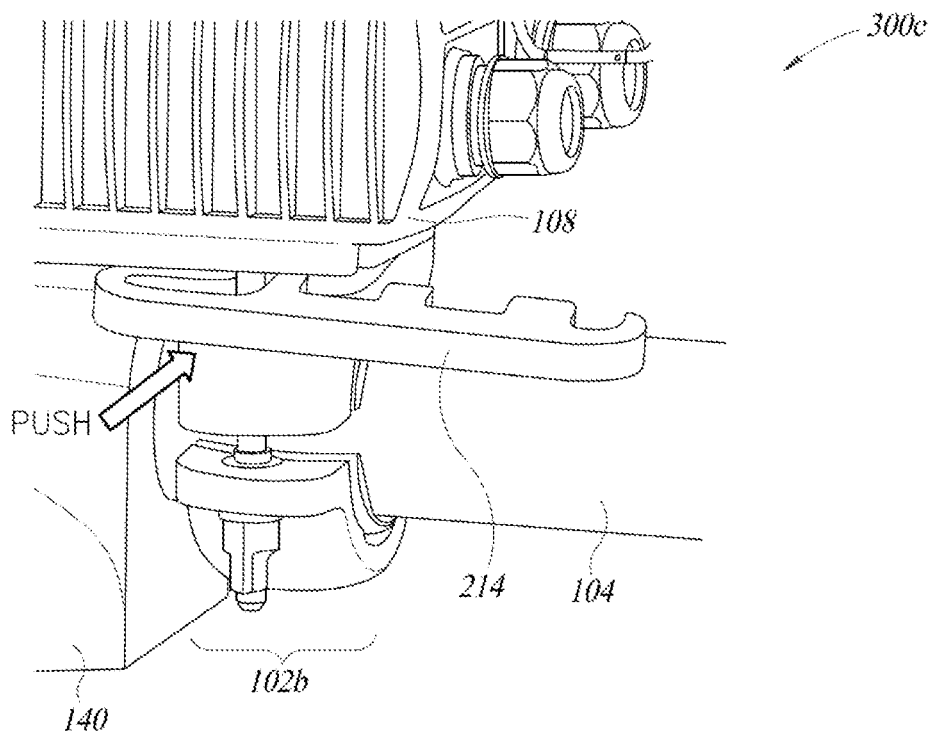
FIGS. 12A-12D show a spacer deployment in four distinct acts.

In a first act of the deployment 300c in FIG. 12A, a first shaped alignment slot 214a (FIG. 8) of the optional spacer 214 is pushed onto an exposed portion of the first threaded rod portion 226a.

Figure 12B:
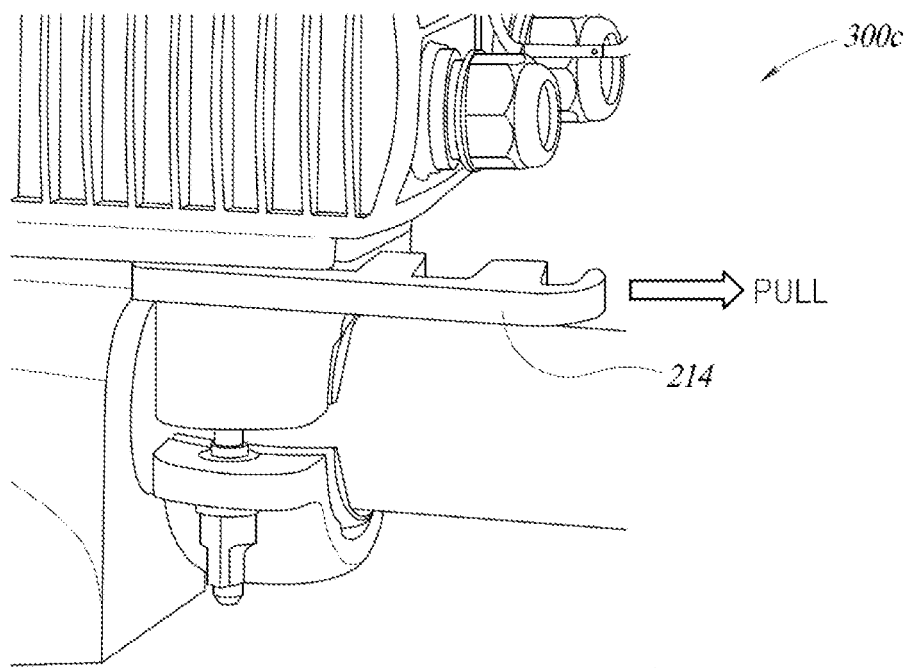

In a second act of the deployment 300c in FIG. 12B, the optional spacer 214 is pulled into a secondary portion of the first shaped alignment slot 214a (FIG. 8).

Figure 12C:
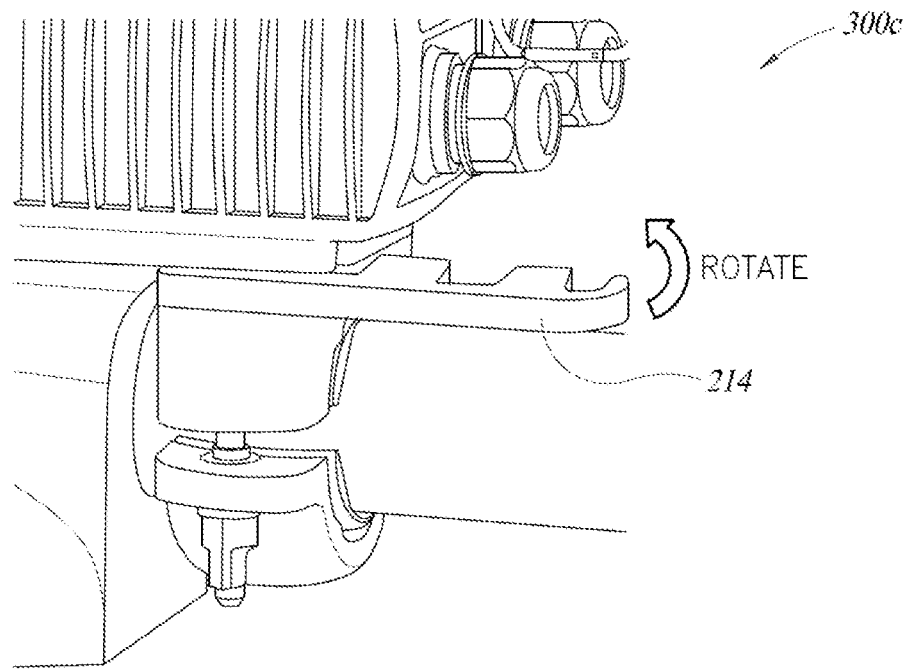

In a third act of the deployment 300c in FIG. 12C, the optional spacer 214 is rotated about the first threaded rod portion 226a, and the second alignment slot 214b (FIG. 8) is aligned on the second threaded rod portion 226b.

Figure 12D:
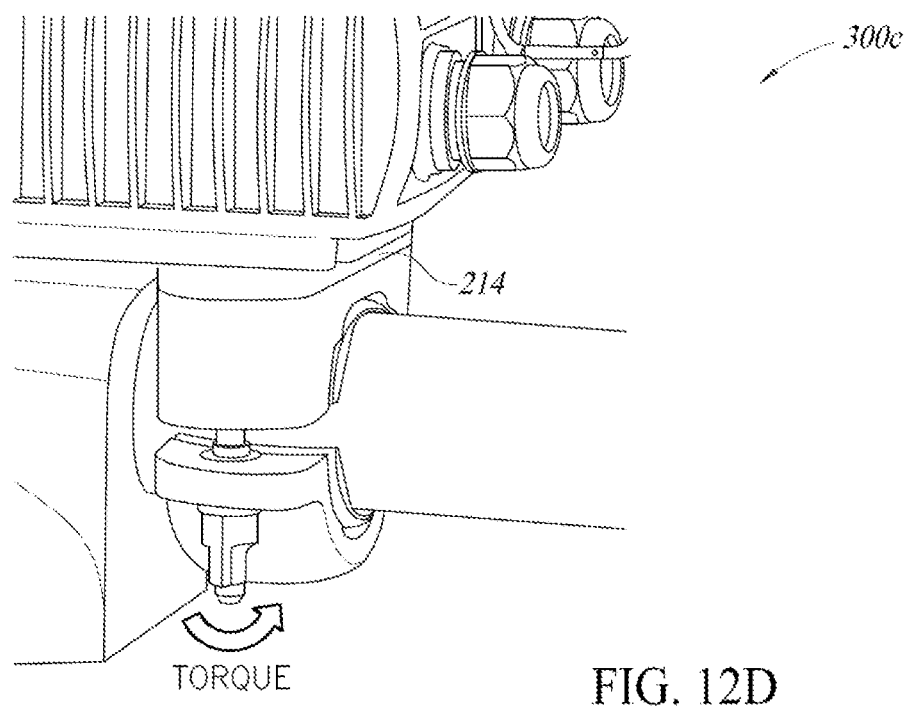

In a fourth act of the deployment 300c in FIG. 12D, the optional spacer 214 is in position, and the first and second threaded nut portions 266a, 266b are tightened to an appropriate level. It is recognized that spacer 214 may have any suitable dimensions. It is further recognized that any suitable number of spacers 214 may be deployed; each of two or more spacers deployed in a "stack" for example.

Figure 13A:
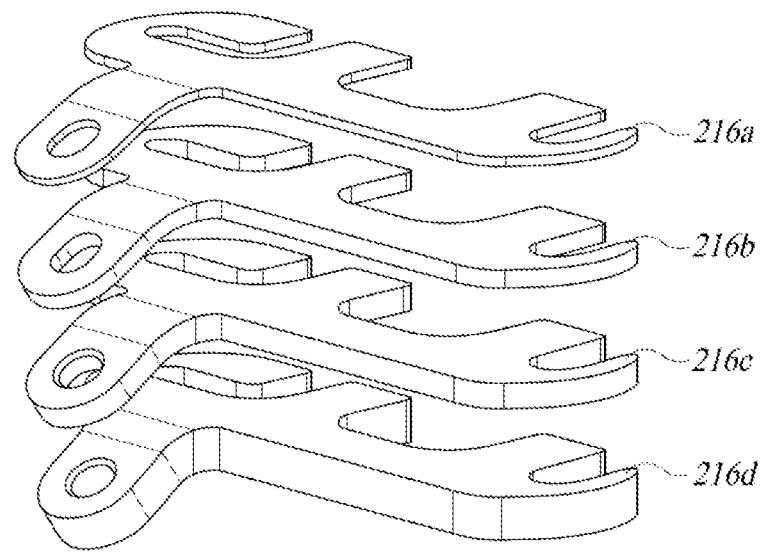
FIGS. 13A-13C are an exemplary set of optional spacers.
Figure 13B:
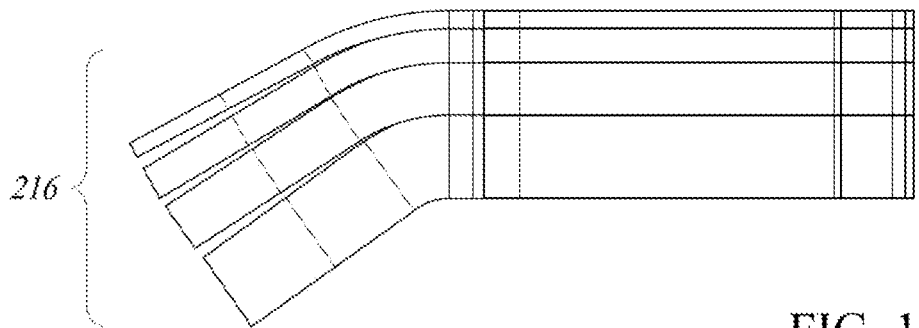
Figure 13C:
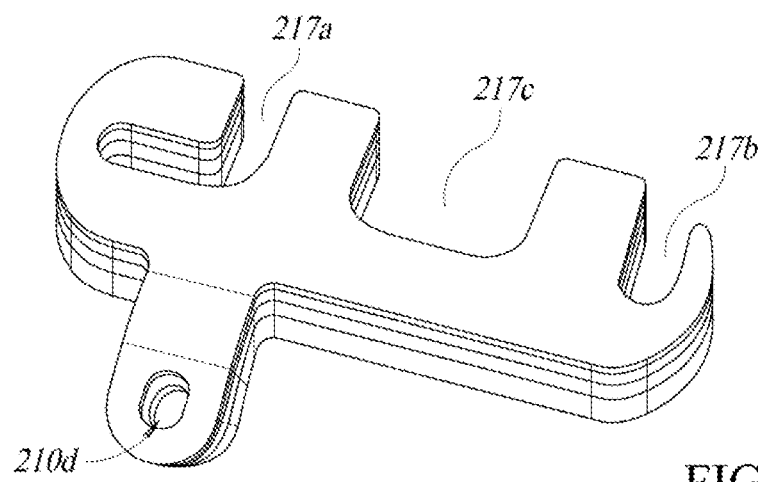

FIGS. 13A-13C are another exemplary set of optional spacers 216a-216d. A first optional spacer 216a has a first thickness (e.g., about 0.075 inches); a second optional spacer 216b has a second thickness (e.g., about 0.15 inches); a third optional spacer 216c has a third thickness (e.g., about 0.225 inches); and a fourth optional spacer 216d has a fourth thickness (e.g., about 0.40 inches). The set of optional spacers 216a-216d may be optionally referred to herein as optional spacers 216. The set of optional spacers 216 may have any number of individual spacers, and any individual spacers may have any desirable dimensions. Optional spacers 216 may be deployed where other optional spacers 214 are taught in the present disclosure.

The optional spacers 216 may have a first shaped alignment slot 217a, a second alignment slot 217b, and an optional weight reduction feature 217c. The optional spacers 216 may have a drop-prevention structure 210d. In some cases, the drop-prevention structure 210d is an oblong aperture that provides a reasonably aligned aperture to receive a device locking means when any suitable plurality of optional spacers 216a-216d are stacked together.

FIGS. 14A-14D show another spacer deployment 300d in four distinct acts. Collectively, FIGS. 14A to 14D may be referred to herein as FIG. 14. In the spacer deployment 300d, a pole clamp 102b has been hand tightened on a generally cylindrical support structure 104. Concurrently, a networking device 108 has been electromechanically coupled to a luminaire 104. The first and second shaped heads 228a, 228b (not identified in FIG. 14) have been coupled to the networking device 108. A user desires to horizontally align the networking device 108 via deployment (e.g., use) of another optional spacer 216. To this end, the user will couple a device locking means 304c (e.g., a carabiner), which is attached to a tether, to the spacer drop-prevention structure 210d (FIG. 13). In the deployment 300d of FIG. 14, a single spacer is being deployed. It is understood by one of skill in the art that any desirable number of spacers 316 (FIG. 13) may be deployed by the user.

Figure 14A:
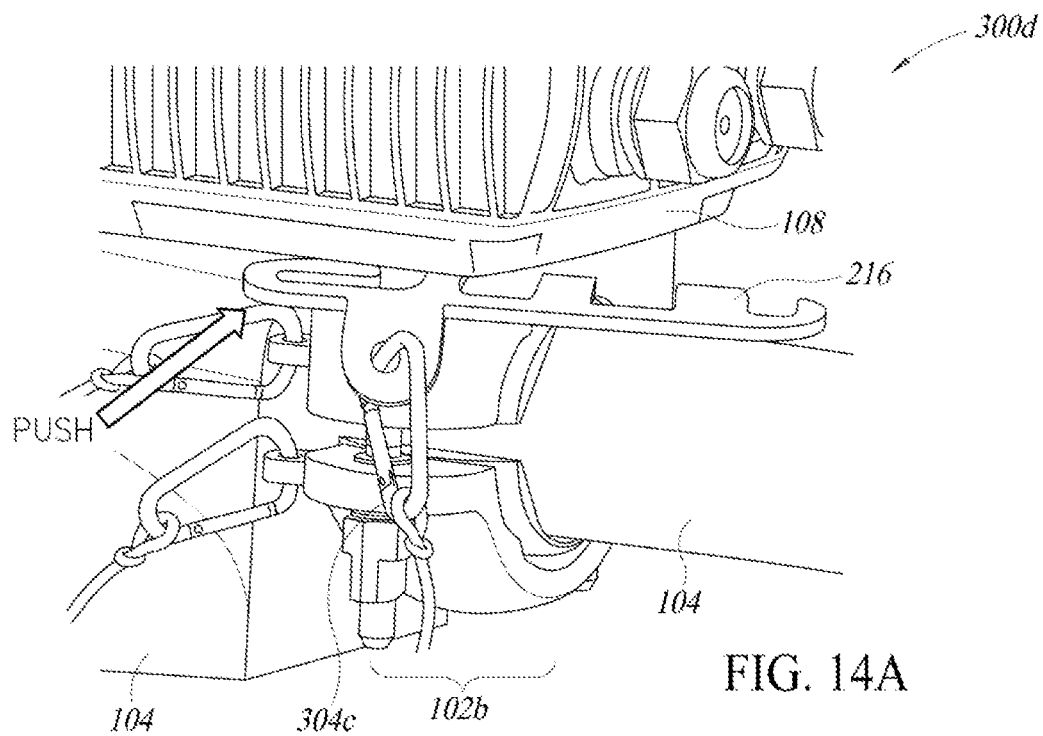
FIGS. 14A-14D show another spacer deployment in four distinct acts.

In a first act of the deployment 300d in FIG. 14A, a first shaped alignment slot 217a (FIG. 13) of the optional spacer 216 is pushed onto an exposed portion of the first threaded rod portion 226a.

Figure 14B:
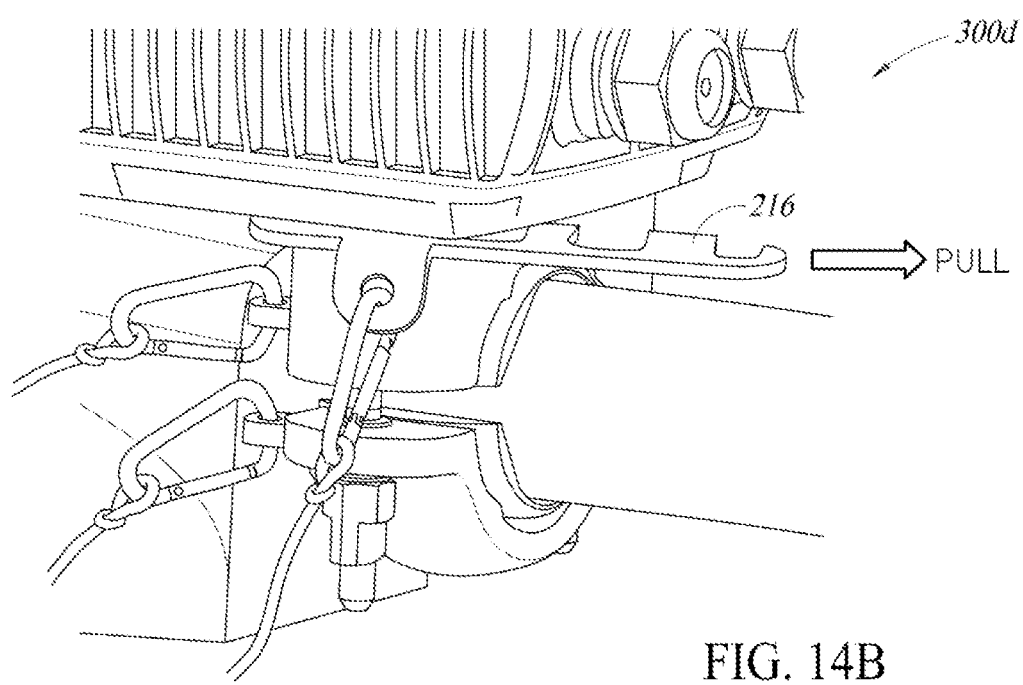

In a second act of the deployment 300d in FIG. 14B, the optional spacer 216 is pulled into a secondary portion of the first shaped alignment slot 217a (FIG. 13).

Figure 14C:
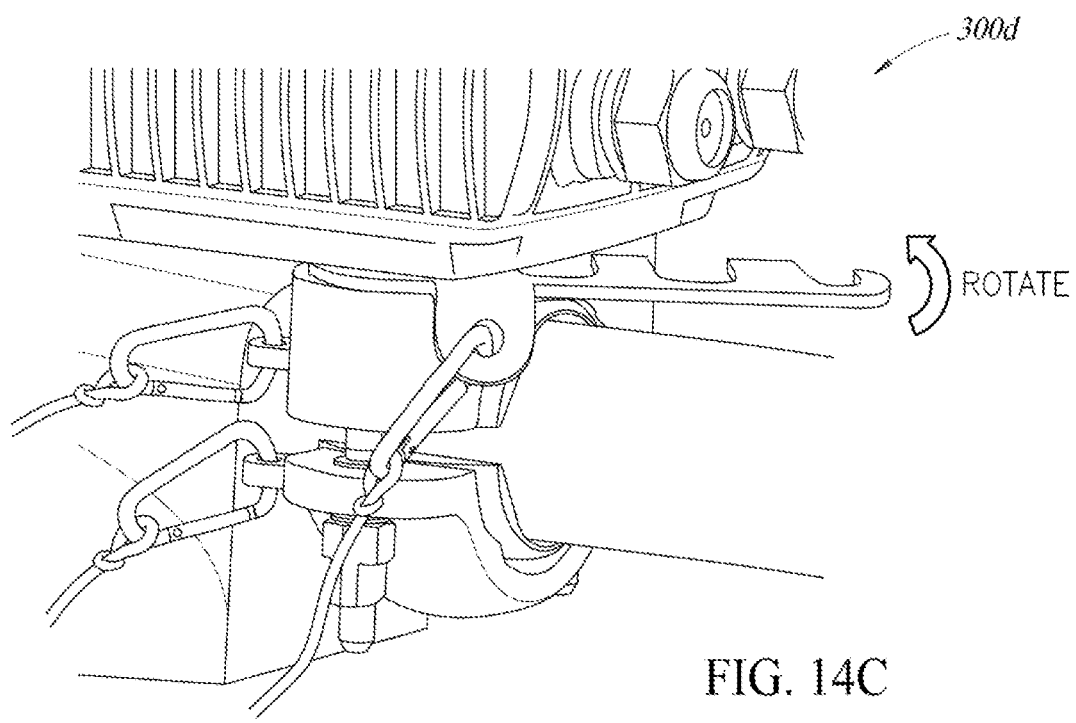

In a third act of the deployment 300d in FIG. 14C, the optional spacer 217 is rotated about the first threaded rod portion 226a, and the second alignment slot 217b (FIG. 13) is aligned on the second threaded rod portion 226b.

Figure 14D:
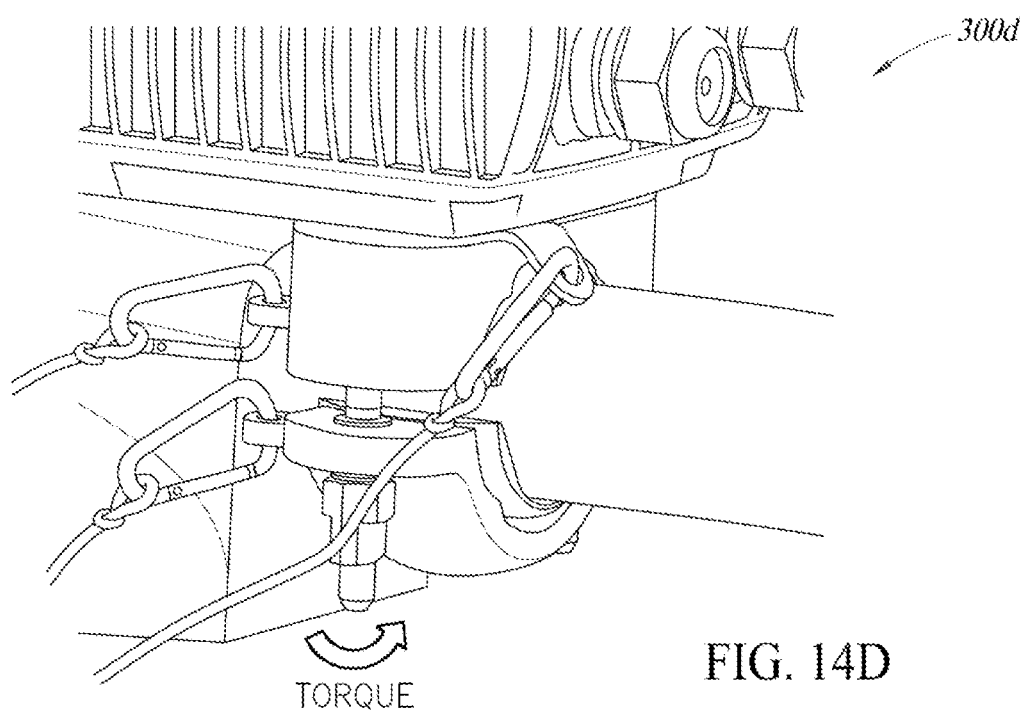

In a fourth act of the deployment 300d in FIG. 14D, the optional spacer 216 is in position, and the first and second threaded nut portions 266a, 266b are tightened to an appropriate level.

Figure 15:
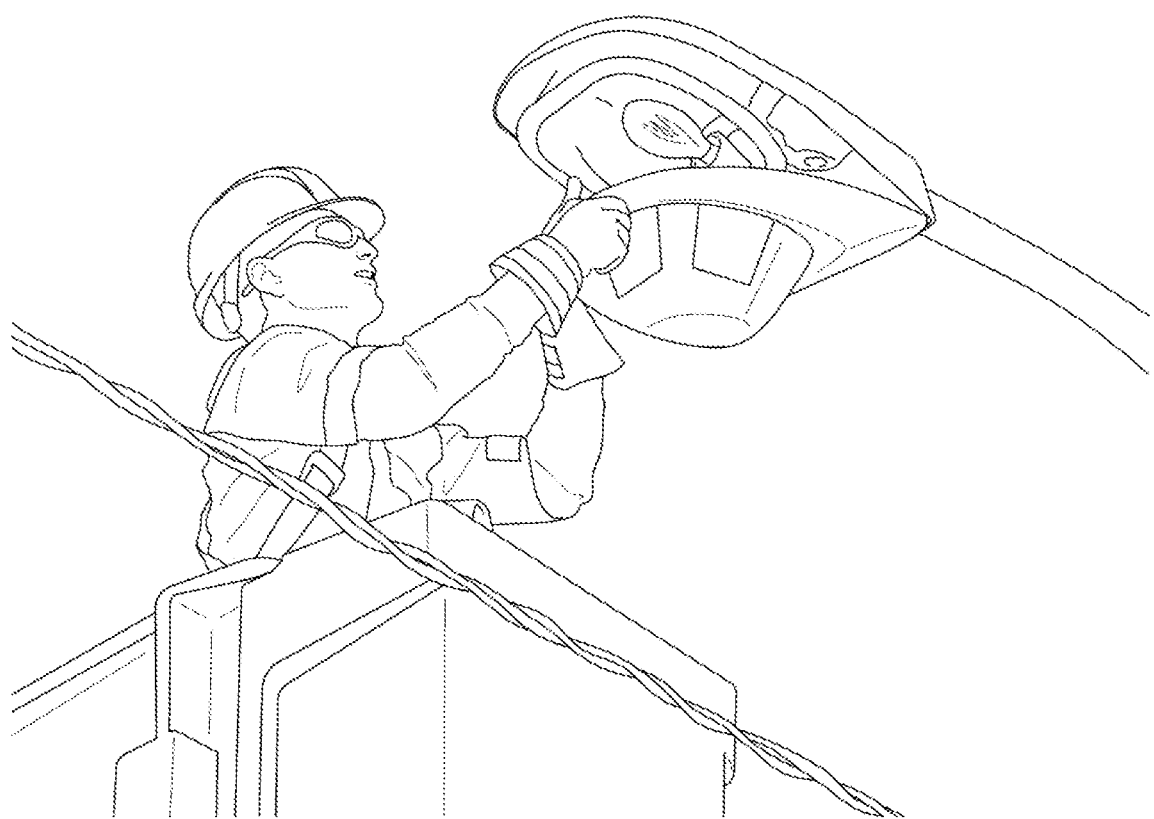
FIG. 15 is a user with a gloved hand servicing a luminaire.

FIG. 15 is a user servicing a luminaire. The user may be a line worker, an electrical power technician, a streetlight installer, or some other user. The user is wearing work gloves of the reasonable and customary type to perform the proscribed duties.

In at least some embodiments, the pole clamps described herein have a length of between about four inches (4 in.) and about ten inches (10 in.), for example about six inches (6 in.). In at least some embodiments, the pole clamps have a width of between about one half inch (0.5 in.) and about five inches (5 in.), for example about two inches (2 in.). In at least some embodiments, the pole clamps have a height of between about two inches (2 in.) and about eight inches (8 in.), for example about three inches (3 in.), wherein the height includes the height of both the first and second clamp body portions.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell housing may be described as being formed or otherwise oriented "substantially horizontal," In these cases, a small cell housing that is oriented exactly horizontal is oriented along an "X" axis that is normal (i.e., 90 degrees or at right angle) to a plane formed by a "Y" axis and a "Z" axis. Different from the exact precision of the term, "horizontal," the use of "substantially" to modify the characteristic permits a variance of the "horizontal" characteristic by up to 30 percent. Accordingly, a small cell housing that is oriented "substantially horizontal" includes small cell housing oriented between 63 degrees and 117 degrees. A small cell housing that is oriented at 45 degrees of an Y-Z plane, however, is not mounted "substantially horizontal." As another example, a clamp having a particular linear dimension of "between about three (3) inches and five (5) inches" includes such devices in which the linear dimension varies by up to 30 percent, Accordingly, the particular linear dimension of the clamp may be between one point five (1.5) inches and six point five (6.5) inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The various embodiments described and illustrated herein can be combined to provide further embodiments. Various features of the embodiments are optional, and, features of one embodiment may be suitably combined with other embodiments. Aspects of the embodiments can be modified, if necessary to employ concepts of the various patents, application and publications to provide yet further embodiments.

Example A-1 is a clamp device, comprising: a first clamp body portion arranged, via one or more gloved hands, for removable coupling about a generally cylindrical support structure to a second clamp body portion, wherein the first clamp body portion includes a first clamp structure containing a first generally semi-spherical floating bushing, the first generally semi-spherical floating bushing coupled to the first clamp structure, and wherein the second clamp body portion includes a second clamp structure containing a second generally semi-spherical floating bushing, the second generally semi-spherical floating bushing coupled to the second clamp structure.

Example A-2 may include the subject matter of Example A-1, and alternatively or additionally any other example herein, wherein the clamp device is further arranged to support a wireless networking device coupled to a luminaire, the luminaire coupled to the generally cylindrical support structure.

Example A-3 may include the subject matter of any of Examples A-1 to A-2, and alternatively or additionally any other example herein, wherein the generally cylindrical support structure is a support arm of a luminaire, the support arm integrated with a light pole, the support arm at least 25 feet above ground level.

Example A-4 may include the subject matter of Example A-3, and alternatively or additionally any other example herein, and further comprise at least one drop-prevention structure.

Example A-5 may include the subject matter of any of Examples A-1 to A-4, and alternatively or additionally any other example herein, wherein the drop-prevention structure is a lug arranged to receive a connecting means such as a carabiner, a hook, a cable tie, or some other connecting means.

Example A-6 may include the subject matter of any of Examples A-1 to A-5, and alternatively or additionally any other example herein, wherein each of the first clamp body portion and the second clamp body portion have an integrated drop-prevention structure.

Example A-7 may include the subject matter of any of Examples A-1 to A-6, and alternatively or additionally any other example herein, and further comprise at least one coupling sub-system, which may include a carriage bolt and cooperating nut (which itself may have an anti-backout device such as a nylon washer), a rotational lever-lock, a cotter and cooperating cotter pin, and the like.

Example A-8 may include the subject matter of any of Examples A-1 to A-7, and alternatively or additionally any other example herein, wherein an outside surface of the first generally semi-spherical floating bushing has a first radius that is aligned with a radius of the generally cylindrical support structure and a second radius that is normal to the first radius.

Example A-9 may include the subject matter of Example A-8, and alternatively or additionally any other example herein, wherein a second outside surface of the second generally semi-spherical floating bushing has a third radius that is aligned with the radius of the generally cylindrical support structure and a fourth radius that is normal to the third radius.

Example A-10 may include the subject matter of Example A-9, and alternatively or additionally any other example herein, wherein the first radius is about identical to the third radius and wherein the second radius is about identical to the fourth radius.

Example A-11 may include the subject matter of any of Examples A-1 to A-10, and alternatively or additionally any other example herein, wherein the first generally semi-spherical floating bushing has a first inside surface, the first inside surface having a first planar region and a second planar region.

Example A-12 may include the subject matter of Example A-11, and alternatively or additionally any other example herein, wherein the second generally semi-spherical floating bushing has a second inside surface, the second inside surface having a third planar region and a fourth planar region, the third planar region arranged to oppose the first planar region of the first generally semi-spherical floating bushing when the first clamp body portion is coupled to the second clamp body portion about the generally cylindrical support structure, and the fourth planar region arranged to oppose the second planar region of the first generally semi-spherical floating bushing when the first clamp body portion is coupled to the second clamp body portion about the generally cylindrical support structure.

Example A-13 may include the subject matter of any of Examples A-1 to A-12, and alternatively or additionally any other example herein, wherein the first clamp structure has a generally semi-spherical inside surface arranged to mate with an outside surface of the first generally semi-spherical floating bushing, and wherein the second clamp structure has a generally semi-spherical inside surface arranged to mate with an outside surface of the second generally semi-spherical floating bushing.

Example A-14 may include the subject matter of any of Examples A-1 to A-13, and alternatively or additionally any other example herein, and further comprise at least one spacer. In at least some cases, the at least one spacer is arranged for placement or coupling between the first clamp structure and a wireless networking device coupled to a luminaire.

Example A-15 may include the subject matter of any of Examples A-1 to A-14, and alternatively or additionally any other example herein, and further comprise at least one coupling sub-system, which may include a threaded rod structure and a corresponding nut structure.

Example A-16 may include the subject matter of Example A-15, and alternatively or additionally any other example herein, wherein the threaded rod structure may include an anti-backout structure such as a plastic, nylon, or steel disc threaded or otherwise placed on the threaded rod structure to retain the threaded rod structure in cooperation with the first clamp body structure.

Example A-17 may include the subject matter of Example A-15, and alternatively or additionally any other example herein, wherein the threaded rod structure may include a shaped head arranged to cooperate with a corresponding receptacle (e.g., T-channel) of another structure mounted on or in proximity to the generally cylindrical support structure. In some cases, the another structure is a wireless networking device. In some cases, the wireless networking device is electromechanically coupled to a luminaire mounted on the generally cylindrical support structure.

Example A-18 may include the subject matter of Example A-15, and alternatively or additionally any other example herein, wherein the corresponding nut structure includes at least two surfaces arranged to be grasped with the gloved hand when the corresponding nut structure is rotated about the threaded rod structure.

Example A-19 may include the subject matter of Example A-15, and alternatively or additionally any other example herein, wherein the corresponding nut structure includes at least one sighting aperture arranged to visually or tactilely expose at least a portion of the threaded rod structure when the corresponding nut structure is rotated about the threaded rod structure.

Example A-20 may include the subject matter of any of Examples A-1 to A-19, and alternatively or additionally any other example, wherein an inside surface of the first generally semi-spherical floating bushing has at least two planar regions arranged to contact the cylindrical support structure when the first clamp body portion is coupled to the second clamp body portion about the generally cylindrical support structure.

Example A-21 may include the subject matter of Example A-20, and alternatively or additionally any other example, wherein an inside surface of the second generally semi-spherical floating bushing has a second plurality of planar regions, wherein various ones of the first plurality of planar regions are arranged to oppose various ones of the second plurality of planar regions.

Example A-22 may include the subject matter of Example A-21, and alternatively or additionally any other example, wherein an inside surface of the first clamp body portion includes a shoulder protuberance arranged to apply force through at least one planar region of the first generally semi-spherical floating bushing when the first clamp body portion is coupled to the second clamp body portion about the generally cylindrical support structure.

Example A-23 may include the subject matter of Example A-22, and alternatively or additionally any other example, wherein an inside surface of the second clamp body portion includes a second shoulder protuberance arranged to apply force through at least one planar region of the second generally semi-spherical floating bushing when the first clamp body portion is coupled to the second clamp body portion about the generally cylindrical support structure.

Example A-24 may include the subject matter of any of Examples A-1 to A-23, and alternatively or additionally any other example herein, wherein the first generally semi-spherical floating bushing further comprises a float coupling, the float coupling arranged to movably couple the first generally semi-spherical floating bushing to the first clamp structure.

Example A-25 may include the subject matter of Example A-24, and alternatively or additionally any other example herein, wherein the float coupling includes a float coupling well in the first generally semi-spherical floating bushing, an aperture in the first clamp structure, and a float shaft passing through the float well and threaded into the aperture in the first clamp structure.

Example A-26 may include the subject matter of Example A-25, and alternatively or additionally any other example herein, wherein the second generally semi-spherical floating bushing further comprises a second float coupling, the second float coupling arranged to movably couple the second generally semi-spherical floating bushing to the second clamp structure, wherein the second float coupling includes a second float coupling well in the second generally semi-spherical floating bushing, a second aperture in the second clamp structure, and a second float shaft passing through the second float well and threaded into the second aperture in the second clamp structure.

Example A-27 may include the subject matter of any of Examples A-1 to A-26, and alternatively or additionally any other example herein, and further comprise a first drop-prevention structure integrated with the first clamp structure and a second drop-prevention structure integrated with the second clamp structure.

Example A-28 may include the subject matter of any of Examples A-1 to A-27, and alternatively or additionally any other example herein, and further comprise at least one coupling sub-system, which may include a threaded rod structure and a corresponding nut structure, said threaded rod structure having a first anti-backout structure arranged to couple the threaded rod structure to the first clamp structure, said corresponding nut structure having a second anti-backout structure arranged to couple the corresponding nut structure to the second clamp structure, said corresponding nut structure further having a seating structure arranged to align at least one portion of the second clamp structure to at least one corresponding portion of the first clamp structure.

Example B-1 is a clamping method, comprising: positioning a first clamp body portion via one or more gloved hands about a generally cylindrical support structure; positioning a second clamp body portion via the one or more gloved hands about the generally cylindrical support structure in opposition to the first clamp body portion; and removably coupling the first clamp body portion to the second clamp body portion via the one or more gloved hands, wherein the first clamp body portion includes a first clamp structure containing a first generally semi-spherical floating bushing, the first generally semi-spherical floating bushing coupled to the first clamp structure, and wherein the second clamp body portion includes a second clamp structure containing a second generally semi-spherical floating bushing, the second generally semi-spherical floating bushing coupled to the second clamp structure.

Example B-2 may include the subject matter of Example B-1, and alternatively or additionally any other example herein, and further comprise coupling a first tether structure to a first drop-prevention structure of the first clamp body portion prior to positioning the first clamp body portion about the generally cylindrical support structure; coupling a second tether structure to a second drop-prevention structure of the second clamp body portion prior to positioning the second clamp body portion about the generally cylindrical support structure; and removing the first and second tether structures from the first and second drop-prevention structures, respectively, after removably coupling the first clamp body portion to the second clamp body portion.

Example B-3 may include the subject matter of any of Examples B-1 to B-2, and alternatively or additionally any other example herein, wherein the generally cylindrical support structure is a support arm of a luminaire, the support arm integrated with a light pole, the support arm at least 25 feet above ground level.

Example C-1 is a clamping system, comprising: a first clamp body portion, the first clamp body portion having a first clamp structure and the first clamp structure having a first generally semi-spherical floating bushing, wherein the first generally semi-spherical floating bushing includes a first inside surface having a first planar region and a second planar region; and a second clamp body portion, the second clamp body portion having a second clamp structure and the second clamp structure having a second generally semi-spherical floating bushing, wherein the second generally semi-spherical floating bushing includes a second inside surface having a third planar region and a fourth planar region, the third planar region arranged to oppose the first planar region when the first clamp body portion is coupled to the second clamp body portion about a generally cylindrical support structure, and the fourth planar region arranged to oppose the second planar region when the first clamp body portion is coupled to the second clamp body portion about the generally cylindrical support structure.

Example C-2 may include the subject matter of Example C-1, and alternatively or additionally any other example herein, and further comprise a first float coupling arranged to movably couple the first generally semi-spherical floating bushing to the first clamp structure; and a second float coupling arranged to movably couple the second generally semi-spherical floating bushing to the second clamp structure.

Example C-3 may include the subject matter of any of Examples C-1 to C-2, and alternatively or additionally any other example herein, and further comprise at least one coupling sub-system having a threaded rod structure and a corresponding nut structure, one of the threaded rod structure and the corresponding nut structure integrated with one of the first clamp body portion and the second clamp body portion and the other of the threaded rod structure and the corresponding nut structure integrated with the other of the first clamp body portion and the second clamp body portion.

Example D-1 is a clamping means, comprising: positioning a first clamp body portion via one or more gloved hands about a generally cylindrical support structure; positioning a second clamp body portion via the one or more gloved hands about the generally cylindrical support structure in opposition to the first clamp body portion; and removably coupling the first clamp body portion to the second clamp body portion via the one or more gloved hands, wherein the first clamp body portion includes a first clamp structure containing a first generally semi-spherical floating bushing, the first generally semi-spherical floating bushing coupled to the first clamp structure, and wherein the second clamp body portion includes a second clamp structure containing a second generally semi-spherical floating bushing, the second generally semi-spherical floating bushing coupled to the second clamp structure.

Example D-2 may include the subject matter of Example D-1, and alternatively or additionally any other example herein, wherein the clamping means is a clamp, a vise, a grip, a press, a brace, a clasp, a bracket, a fastener, or some other such binding means arranged to removably or fixedly couple, fasten, secure, fix, clinch, clench, squeeze, press, grip, hold, brace, or otherwise immobilize an object relative to a pole, a pipe, a cable, or another generally cylindrical structure.

Example D-3 may include the subject matter of any of Examples D-1 to D-2, and alternatively or additionally any other example herein, wherein the clamping means comprises: a first clamp body means arranged for removable coupling about a generally cylindrical support structure to a second clamp body means, wherein the first clamp body means includes a first clamp means containing a first generally semi-spherical floating bushing means, the first generally semi-spherical floating bushing means coupled to the first clamp means, and wherein the second clamp body means includes a second clamp means containing a second generally semi-spherical floating bushing means, the second generally semi-spherical floating bushing means coupled to the second clamp means.

Example D-4 may include the subject matter of any of Examples D-1 to D-3, and alternatively or additionally any other example herein, wherein the generally cylindrical structure has a diameter between about two inches and about twelve inches.

Example D-5 may include the subject matter of any of Examples D-1 to D-4, and alternatively or additionally any other example herein, wherein the generally cylindrical structure has a diameter less than about two inches.

Example D-6 may include the subject matter of any of Examples D-1 to D-4, and alternatively or additionally any other example herein, wherein the generally cylindrical structure has a diameter more than about twelve inches.

Example D-7 may include the subject matter of any of Examples D-1 to D-4, and alternatively or additionally any other example herein, wherein the generally cylindrical structure has a cross-section having a circular shape, an ovular shape, a square shape, a triangular shape, a hexagonal shape, or an octagonal shape.

Example D-8 may include the subject matter of any of Examples D-1 to D-7, and alternatively or additionally any other example herein, wherein at least one of the first generally semi-spherical floating bushing means and the second generally semi-spherical floating bushing means is formed from copper or a copper-alloy.

Example D-9 may include the subject matter of any of Examples D-1 to D-8, and alternatively or additionally any other example herein, wherein at least one of the first generally semi-spherical floating bushing means and the second generally semi-spherical floating bushing means is arranged to float laterally or rotationally, or both.

Example D-10 may include the subject matter of any of Examples D-1 to D-9, and alternatively or additionally any other example herein, wherein at least one of the first generally semi-spherical floating bushing means and the second generally semi-spherical floating bushing means is arranged to permit an object to be clamped in any desirable direction.

Example E-1 is a system, comprising: a clamp, a device to be clamped, and a generally cylindrical support structure arranged to receive the clamp, wherein the clamp includes: a first clamp body portion; a second clamp body portion arranged for removable coupling to the first clamp body portion; and at least one floating bushing arranged to transfer a binding force from a first or second clamp body portion to the generally cylindrical support structure.

Example E-2 may include the subject matter of Example E-1, and alternatively or additionally any other example herein, wherein the generally cylindrical support structure is a support arm integrated into a light pole.

Example E-3 may include the subject matter of any of Examples E-1 to E-2, and alternatively or additionally any other example herein, wherein the generally cylindrical support structure is arranged in a generally horizontal attitude with respect to the earth.

Example E-4 may include the subject matter of any of Examples E-1 to E-3, and alternatively or additionally any other example herein, wherein one or more components of the clamp are cast components, machined components, forged components, or extruded components.

Example E-5 may include the subject matter of any of Examples E-1 to E-4, and alternatively or additionally any other example herein, wherein one or more components of the clamp are formed of metal, plastic, a composite material, or an alloy.

Example E-6 may include the subject matter of any of Examples E-1 to E-5, and alternatively or additionally any other example herein, wherein the device to be clamped is a light control device, a networking device, a telecommunications device, a sign control device, and edge computing device, a Wi-Fi® device, or some other such device.

Example E-7 may include the subject matter of any of Examples E-1 to E-6, and alternatively or additionally any other example herein, wherein the device to be clamped is electromechanically coupled to a luminaire.

Example E-8 may include the subject matter of Example E-7, and alternatively or additionally any other example herein, wherein the luminaire is a light emitting diode (LED) light source, an incandescent light source, a halogen light source, a metal halide light source, a sodium vapor discharge light source, fluorescent light source, neon light source, or a light source having some other suitable medium for generating light.

Example E-9 may include the subject matter of any of Examples E-7 to E-8, and alternatively or additionally any other example herein, wherein the electromechanical coupling to the luminaire is via a connector and socket subsystem.

Example E-10 may include the subject matter of Example E-9, and alternatively or additionally any other example herein, wherein the connector is integrated with the device to be clamped and the socket is integrated with the luminaire.

Example E-11 may include the subject matter of any of Examples E-9 to E-10, and alternatively or additionally any other example herein, wherein the connector and socket subsystem comply with a published National Electrical Manufacturers Association (NEMA) interface.

Example E-12 may include the subject matter of Example E-11, and alternatively or additionally any other example herein, wherein the NEMA interface is an American National Standards Institute (ANSI) compliant interface directed toward Roadway and Area Lighting Equipment and referred to as ANSI C136.

Example E-13 may include the subject matter of any of Examples E-1 to E-12, and alternatively or additionally any other example herein, and may further comprise at least one drop-prevention structure.

Example E-14 may include the subject matter of any of Examples E-1 to E-13, and alternatively or additionally any other example herein, wherein the first clamp body portion includes a first drop-prevention structure, the second clamp body portion includes a second drop-prevention structure, and the device to be clamped includes a third drop-prevention structure.

Example E-15 may include the subject matter of any of Examples E-13 to E-14, and alternatively or additionally any other example herein, wherein each drop-prevention structure includes a lug arranged to receive a connecting structure such as a carabiner, a hook, a cable tie, or some other connecting structure.

Example E-16 may include the subject matter of any of Examples E-1 to E-15, and alternatively or additionally any other example herein, and may further comprise at least one coupling sub-system arranged to removably couple the first clamp body portion to the second clamp body portion.

Example E-17 may include the subject matter of Example E-16, and alternatively or additionally any other example herein, wherein the at least one coupling sub-system includes a first threaded rod portion and a correspondingly threaded first nut portion, and a second threaded rod portion and a correspondingly threaded second nut portion.

Example E-18 may include the subject matter of Example E-17, and alternatively or additionally any other example herein, wherein the first and second threaded rod portions have an outside nominal diameter of about three sixteenths inch (3/16 in.), one fourth inch (1/4 in.), five sixteenths inch (5/16 in.), or three eighths inch (3/8 in.), and wherein the first and second correspondingly threaded nut portions have a respective inside nominal diameter of about three sixteenths inch (3/16 in.), one fourth inch (1/4 in.), five sixteenths inch (5/16 in.), or three eighths inch (3/8 in.).

Example E-19 may include the subject matter of any of Examples E-16 to E18, and alternatively or additionally any other example herein, wherein the first clamp body portion includes one or more anti-rotation shaped repositories to receive a correspondingly shaped structures of the first and second threaded rod portions.

Example E-20 may include the subject matter of any of Examples E-16 to E19, and alternatively or additionally any other example herein, wherein the first nut portion and the second nut portion each include one or more anti-backout devices.

Example E-21 may include the subject matter of any of Examples E-16 to E-20, and alternatively or additionally any other example herein, wherein the at least one coupling sub-system includes one or more anti-backout devices.

Example E-22 may include the subject matter of Example E-21, and alternatively or additionally any other example herein, wherein the one or more anti-backout devices includes a plastic washer, a nylon washer, a rotational lever-lock, a cotter and cooperating cotter pin, or some other coupling means.

Example E-23 may include the subject matter of any of Examples E-1 to E-22, and alternatively or additionally any other example herein, and may further comprise at least one spacer arranged to change an operational height of the clamp.

Example E-24 may include the subject matter of Example E-23, and alternatively or additionally any other example herein, wherein the at least one spacer is arranged to alight the device to be clamped into a generally horizontal attitude with respect to the earth.

Example E-25 may include the subject matter of any of Examples E-23 to E-24, and alternatively or additionally any other example herein, wherein the at least one spacer is arranged for coupling between the first clamp portion and the device to be clamped.

Example E-26 may include the subject matter of any of Examples E-23 to E-25, and alternatively or additionally any other example herein, wherein the at least one spacer has a height of about one-eighth inch (1/8 in.), one-quarter inch (1/4 in.), three-eighths inch (3/8 in.), or one-half inch (1/2 in.).

Example E-27 may include the subject matter of any of Examples E-23 to E-26, and alternatively or additionally any other example herein, wherein the at least one spacer has at least one aperture arranged for containment by a portion of the at least one coupling sub-system.

Example E-28 may include the subject matter of any of Examples E-1 to E-27, and alternatively or additionally any other example herein, wherein the at least one floating bushing is a generally semi-spherical floating bushing.

Example E-29 may include the subject matter of any of Examples E-1 to E-28, and alternatively or additionally any other example herein, wherein an outside surface of the at least one floating bushing is arranged to mate with an inside surface of the first or second clamp body portion.

Example E-30 may include the subject matter of any of Examples E-1 to E-29, and alternatively or additionally any other example herein, wherein an outside surface of the at least one floating bushing has a first radius that is aligned with a radius of the generally cylindrical support structure and a second radius that is normal to the first radius.

Example E-31 may include the subject matter of Example E-30, and alternatively or additionally any other example herein, wherein the first radius is between about one inch (1.0 in.) and about twelve inches (12.0 in.).

Example E-32 may include the subject matter of any of Examples E-1 to E-31, and alternatively or additionally any other example herein, wherein an inside surface of the at least one floating bushing has at least two generally planar regions.

Example E-33 may include the subject matter of any of Examples E-1 to E-32, and alternatively or additionally any other example herein, wherein an inside surface of the at least one floating bushing has two generally planar regions, the two generally planar regions forming opposing sides of a first trapezoidal shape when the clamp is cross-sectionally viewed along a major axis of the generally cylindrical support structure.

Example E-34 may include the subject matter of any of Examples E-1 to E-33, and alternatively or additionally any other example herein, wherein the at least one floating bushing includes a first floating bushing arranged to mate with the first clamp body portion and the at least one floating bushing includes a second floating bushing arranged to mate with the second clamp body portion, wherein the first floating bushing includes a first planar surface and a second planar surface and the second floating bushing includes a third planar surface and a fourth planar surface wherein after coupling the first and second clamp body portions together about the generally cylindrical support structure, the first planar surface will oppose the third planar surface and the second planar surface will oppose the fourth planar surface.

Example E-35 may include the subject matter of Example E-34, and alternatively or additionally any other example herein, wherein forces applied through each of the two opposing planar surfaces will be generally symmetric.

Example E-36 may include the subject matter of Example E-35, and alternatively or additionally any other example herein, wherein generally symmetric forces applied through the first and second planar surfaces will be about the same as generally symmetric forces applied through the third and fourth planar surfaces.

Example E-37 may include the subject matter of any of Examples E-1 to E-36, and alternatively or additionally any other example herein, wherein the first clamp body portion has a generally semi-spherical inside surface arranged to mate with an outside surface of the at least one floating bushing, said mating surfaces arranged to spread a clamping force in a generally even distribution throughout the first clamp body portion thereby resisting substantial deformation of the clamp and the generally cylindrical support structure.

Example E-38 may include the subject matter of any of Examples E-1 to E-37, and alternatively or additionally any other example herein, wherein the at least one floating bushing includes a radially truncated outer surface. Example E-39 may include the subject matter of any of Examples E-1 to E-38, and alternatively or additionally any other example herein, and may further comprise at least one coupling sub-system arranged to removably couple the first clamp body portion to the second clamp body portion.

Example E-40 may include the subject matter of Example E-39, and alternatively or additionally any other example herein, wherein the at least one coupling sub-system is further arranged to couple the clamp to the device to be clamped.

Example E-41 may include the subject matter of any of Examples E-39 to E-40, and alternatively or additionally any other example herein, wherein the at least one coupling sub-system includes a plurality of threaded rod portions, and a corresponding plurality of threaded nut portions, wherein the plurality of threaded rod portions include a shaped head arranged to cooperate with a corresponding receptacle of the device to be clamped. Example E-42 may include the subject matter of Example E-41, and alternatively or additionally any other example herein, wherein the receptacle of the device to be clamped includes at least one T-channel.

Example E-43 may include the subject matter of any of Examples E-39 to E-42, and alternatively or additionally any other example herein, wherein each of the plurality of threaded nut portions includes at least two surfaces arranged to be grasped with a gloved hand when a selected threaded nut portion is rotated about a selected threaded rod portion.

Example E-44 may include the subject matter of any of Examples E-39 to E-43, and alternatively or additionally any other example herein, wherein a surface of a selected threaded nut portion arranged to be grasped with a gloved hand has a planar surface, a concave surface, a convex surface, a knurled surface, a plated surface, or a surface covered with a high friction material.

Example E-45 may include the subject matter of any of Examples E-39 to E-44, and alternatively or additionally any other example herein, wherein a surface of a selected threaded nut portion arranged to be grasped with a gloved hand has an area of at least one-half square inch (0.5 sq. in.), one square inch (1.0 sq. in.), two square inches (2.0 sq. in.) or some other size.

Example E-46 may include the subject matter of any of Examples E-39 to E-45, and alternatively or additionally any other example herein, wherein a surface of a selected threaded nut portion arranged to be grasped with a gloved hand will maintain a linear distance of at least one-half inch (0.5 in.), three-fourths of an inch (0.75 in.), one inch (1.0 in.) or some other distance from an adjacent one of the first and second clamp body portions.

Example E-47 may include the subject matter of any of Examples E-39 to E-46, and alternatively or additionally any other example herein, wherein a selected threaded nut portion includes at least one sighting aperture arranged to visually or tactilely expose at least a portion of a selected threaded rod portion when the selected threaded nut portion is rotated about the selected threaded rod portion.

Example E-48 may include the subject matter of any of Examples E-39 to E-47, and alternatively or additionally any other example herein, wherein a selected threaded nut portion has associated therewith at least one force distribution device arranged to provide tension against a corresponding selected threaded rod portion when the clamp is deployed.

Example E-49 may include the subject matter of Example E-48, and alternatively or additionally any other example herein, wherein the at least one force distribution device is a wedge lock washer, a split washer, a star-type washer, a spring washer, or some other type of force distribution device.

Example E-50 may include the subject matter of any of Examples E-39 to E-49, and alternatively or additionally any other example herein, wherein a selected threaded nut portion has associated therewith at least one anti-backout structure arranged to keep the selected threaded nut portion coupled to the second clamp body portion.

Example E-51 may include the subject matter of any of Examples E-39 to E-49, and alternatively or additionally any other example herein, wherein an anti-backout structure associated with a selected threaded nut portion is a push nut.

Example E-52 may include the subject matter of Example E-51, and alternatively or additionally any other example herein, wherein the push nut is formed of stainless steel, brass, aluminum, zinc, plastic, nylon, or some other material.

Example E-53 may include the subject matter of any of Examples E-51 to E-52, and alternatively or additionally any other example herein, wherein the push nut includes a flange formed on an inside diameter of the push nut to permit easy friction entry of the push nut onto a shaft of the selected threaded nut portion, and more difficult friction exit of the push nut from the shaft of the selected threaded nut portion.

Example E-54 may include the subject matter of any of Examples E-39 to E-53, and alternatively or additionally any other example herein, wherein the at least one coupling sub-system includes a cylindrical guide arranged to receive a threaded rod portion of the at least one coupling sub-system.

Example E-55 may include the subject matter of Example E-54, and alternatively or additionally any other example herein, wherein the cylindrical guide has an inside diameter only slightly larger than the outside diameter of a selected threaded rod portion.

Example E-56 may include the subject matter of Example E-55, and alternatively or additionally any other example herein, wherein the cylindrical guide has a taper at its distal end to facilitate entry of a selected threaded rod portion that has a bulleted, tapered, or otherwise formed distal end.

Example E-57 may include the subject matter of any of Examples E-1 to E-56, and alternatively or additionally any other example herein, wherein the first and second clamp body portions include at least one shoulder protuberance arranged to apply force through at least one planar region of the at least one floating bushing.

Example E-58 may include the subject matter of any of Examples E-1 to E-57, and alternatively or additionally any other example herein, wherein the at least one floating bushing includes a float coupling well arranged to receive a structure that movably bonds the at least one floating bushing to a correspond of the first and second clamp body portions, the at least one floating bushing thereby permitted to move laterally and rotationally within a selected range of motion.

Example E-59 may include the subject matter of any of Examples E-1 to E-58, and alternatively or additionally any other example herein, wherein the at least one clamp has a length of between about four inches (4 in.) and about ten inches (10 in.).

Example E-60 may include the subject matter of any of Examples E-1 to E-59, and alternatively or additionally any other example herein, wherein the at least one clamp has a length of about six inches (6 in.).

Example E-61 may include the subject matter of any of Examples E-1 to E-60, and alternatively or additionally any other example herein, wherein the at least one clamp has a width of between about one half inch (0.5 in.) and about five inches (5 in.).

Example E-62 may include the subject matter of any of Examples E-1 to E-61, and alternatively or additionally any other example herein, wherein the at least one clamp has a width of about two inches (2 in.).

Example E-63 may include the subject matter of any of Examples E-1 to E-62, and alternatively or additionally any other example herein, wherein the at least one clamp has a height of between about two inches (2 in.) and about eight inches (8 in.), wherein the height includes a height of the first clamp body portion and a height of the second clamp body portion.

Example E-64 may include the subject matter of any of Examples E-1 to E-63, and alternatively or additionally any other example herein, wherein the at least one clamp has a height of about three inches (3 in.), wherein the height includes a height of the first clamp body portion and a height of the second clamp body portion.

Example E-65 may include the subject matter of any of Examples E-1 to E-64, and alternatively or additionally any other example herein, wherein various portions of the clamp are powder-coated with a polymer-based paint.

Example E-66 may include the subject matter of any of Examples E-65, and alternatively or additionally any other example herein, wherein various portions of the clamp are powder-coated with a polymer-based paint.

U.S. Provisional Patent Application No. 62/809,520, filed Feb. 22, 2019 is incorporated herein by reference, in its entirety. U.S. Provisional Patent Application No. 62/851,035, filed May 21, 2019 is incorporated herein by reference, in its entirety. The various embodiments described above can be combined to provide further embodiments. Aspects of the embodiments can be modified, if necessary, to employ concepts of the various patent applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A clamp comprising:
 a first clamp body portion including a first clamp structure coupled to a first generally semi-spherical floating bushing, an outside surface of the first floating bushing being sized and shaped to match an inside surface of the first clamp structure, an inside surface of the first floating bushing defining two generally planar end regions interconnected by at least an arched central region;
 a second clamp body portion arranged for removable coupling to the first body clamp portion, the second body clamp portion including a second clamp structure coupled to a second generally semi-spherical floating bushing, an outside surface of the second floating bushing being sized and shaped to match an inside surface of the second clamp structure, an inside surface of the second floating bushing defining two generally planar end regions interconnected by at least an arched central region; and
 at least one drop-prevention structure coupled to at least one of the first clamp body portion and the second clamp body portion.

2. The clamp of claim 1, wherein the first clamp body portion and the second clamp body portion are arranged to be coupled about a generally cylindrical support structure.

3. The clamp of claim 1, further comprising:
 a first float coupling arranged to movably couple the first floating bushing to the first clamp structure; and
 a second float coupling arranged to movably couple the second floating bushing to the second clamp structure.

4. The clamp of claim 1, wherein the first clamp body portion is arranged for coupling to the second clamp body portion via gloved hands.

5. The clamp of claim 1, wherein the first clamp body portion is an upper portion of the clamp and wherein the second clamp body portion is a lower portion of the clamp.

6. The clamp of claim 1, wherein the at least one drop-prevention structure comprises:
at least one lug arranged to receive a connecting means.

7. The clamp of claim 1, wherein the outside surface of the first floating bushing has a first radius and a second radius, the second radius being normal to the first radius.

8. The clamp of claim 7, wherein the outside surface of the second floating bushing has a third radius and a fourth radius, the fourth radius being normal to the third radius.

9. The clamp of claim 8, wherein the first radius is about identical to the third radius and wherein the second radius is about identical to the fourth radius.

10. The clamp of claim 1, wherein the inside surface of the second clamp structure and the outside surface of the second floating bushing are generally semi-spherical.

11. The clamp of claim 1, wherein the generally planar end regions of the first floating bushing oppose the generally planar end regions of the second floating bushing when the first clamp body portion is coupled to the second clamp body portion.

12. The clamp of claim 1, wherein the inside surface of the first clamp structure and the outside surface of the first floating bushing are generally semi-spherical.

13. The clamp of claim 1, further comprising:
at least one spacer arranged for placement upon the first clamp structure to raise an operational height of the clamp.

14. A clamping system comprising:
a first clamp body portion having a first clamp structure, the first clamp structure having a first generally semi-spherical floating bushing, wherein the first floating bushing includes an inside surface defining two generally planar end regions interconnected by at least an arched central region;
a second clamp body portion configured to be coupled to the first clamp body portion, the second clamp body portion having a second clamp structure and the second clamp structure having a second generally semi-spherical floating bushing, wherein the second floating bushing includes an inside surface defining two generally planar end regions interconnected by at least an arched central region, the generally planar end regions of the first floating bushing opposing the generally planar end regions of the second floating bushing when the first clamp body portion is coupled to the second clamp body portion; and
at least one drop-prevention structure coupled to at least one of the first clamp body portion and the second clamp body portion.

15. The clamping system of claim 14, further comprising:
a first float coupling arranged to movably couple the first floating bushing to the first clamp structure; and
a second float coupling arranged to movably couple the second floating bushing to the second clamp structure.

16. The clamping system of claim 14, further comprising:
at least one coupling sub-system having a threaded rod structure and a corresponding nut structure, the threaded rod structure being integrated with the first clamp body portion and the corresponding nut structure being integrated with the second clamp body portion.

17. The clamping system of claim 14, further comprising:
at least one coupling sub-system having a threaded rod structure and a corresponding nut structure, the threaded rod structure being integrated with the second clamp body portion and the corresponding nut structure being integrated with the first clamp body portion.

18. The clamp of claim 1, further comprising:
at least one coupling sub-system having a threaded rod structure and a corresponding nut structure, the threaded rod structure being integrated with the first clamp body portion and the corresponding nut structure being integrated with the second clamp body portion.

19. The clamp of claim 1, further comprising:
at least one coupling sub-system having a threaded rod structure and a corresponding nut structure, the threaded rod structure being integrated with the second clamp body portion and the corresponding nut structure being integrated with the first clamp body portion.

* * * * *